United States Patent
Maniv et al.

(10) Patent No.: US 12,504,424 B2
(45) Date of Patent: Dec. 23, 2025

(54) SYSTEMS AND METHODS FOR IN-VITRO MODELING OF NEURODEGENERATIVE DISEASES

(71) Applicant: TECHNION RESEARCH & DEVELOPMENT FOUNDATION LIMITED, Haifa (IL)

(72) Inventors: Inbal Maniv, Haifa (IL); Michael H. Glickman, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 839 days.

(21) Appl. No.: 17/642,928

(22) PCT Filed: Sep. 13, 2020

(86) PCT No.: PCT/IL2020/051002
§ 371 (c)(1),
(2) Date: Mar. 14, 2022

(87) PCT Pub. No.: WO2021/048861
PCT Pub. Date: Mar. 18, 2021

(65) Prior Publication Data
US 2022/0365073 A1 Nov. 17, 2022

Related U.S. Application Data

(60) Provisional application No. 62/899,260, filed on Sep. 12, 2019.

(51) Int. Cl.
| | |
|---|---|
| *G01N 33/50* | (2006.01) |
| *A61P 25/28* | (2006.01) |
| *C12N 5/0793* | (2010.01) |
| *C12N 5/0797* | (2010.01) |
| *C12N 15/113* | (2010.01) |
| *C12N 15/86* | (2006.01) |

(52) U.S. Cl.
CPC .......... *G01N 33/5058* (2013.01); *A61P 25/28* (2018.01); *C12N 5/0619* (2013.01); *C12N 15/113* (2013.01); *C12N 15/86* (2013.01); *G01N 33/5023* (2013.01); *C12N 2310/141* (2013.01); *C12N 2503/02* (2013.01); *C12N 2513/00* (2013.01); *C12N 2533/50* (2013.01); *C12N 2533/70* (2013.01); *C12N 2740/15043* (2013.01)

(58) Field of Classification Search
CPC . G01N 33/5058; G01N 33/5023; A61P 25/28; C12N 5/0619; C12N 15/113; C12N 15/86; C12N 2310/141; C12N 2503/02; C12N 2513/00; C12N 2533/50; C12N 2533/70; C12N 2740/15043; C12N 2501/727; C12N 2506/45; C12N 2533/32; C12N 2533/52; C12N 5/0623
See application file for complete search history.

(56) References Cited

PUBLICATIONS

NCBI Accession No. 3K9O_B (2 pages, Oct. 10, 2012) (Year: 2012).*

Choi SH, Kim YH, Hebisch M, Sliwinski C, Lee S, D'Avanzo C, Chen H, Hooli B, Asselin C, Muffat J, Klee JB, Zhang C. Wainger BJ, Peitz M, Kovacs DM, Woolf CJ, Wagner SL, Tanzi RE, Kim Dy. A three-dimensional human neural cell culture model of Alzheimer's disease. Nature. Nov. 13, 2014;515(7526):274-8. doi: 10.1038/nature13800. Epub Oct. 12, 2014. PMID: 25307057; PMCID: PMC4366007.

Raja WK, Mungenast AE, Lin YT, Ko T, Abdurrob F, Seo J, Tsai LH. Self-Organizing 3D Human Neural Tissue Derived from Induced Pluripotent Stem Cells Recapitulate Alzheimer's Disease Phenotypes. PLoS One. Sep. 13, 2016;11(9): e0161969. doi: 10.1371/journal.pone.0161969. PMID: 27622770; PMCID: PMC5021368.

Ranjan VD, Qiu L, Tan EK, Zeng L, Zhang Y. Modelling Alzheimer's disease: Insights from in vivo to in vitro three-dimensional culture platforms. J Tissue Eng Regen Med. Sep. 2018;12(9):1944-1958. doi: 10.1002/term.2728. Epub Aug. 13, 2018. PMID: 30011422.

Van Leeuwen FW, Hol EM, Fischer DF. Frameshift proteins in Alzheimer's disease and in other conformational disorders: time for the ubiquitin-proteasome system. J Alzheimers Dis. 2006;9(3 Suppl):319-25. doi: 10.3233/jad-2006-9s336. PMID: 16914870.

Yan W, Liu W, Qi J, Fang Q, Fan Z, Sun G, Han Y, Zhang D, Xu L, Wang M, Li J, Chen F, Liu D, Chai R, Wang H. A Three-Dimensional Culture System with Matrigel Promotes Purified Spiral Ganglion Neuron Survival and Function In Vitro. Mol Neurobiol. Mar. 2018;55(3):2070-2084. doi: 10.1007/s12035-017-0471-0. Epub Mar. 10, 2017. PMID: 28283883.

Maniv, I. (2019). The role of UBB+1 in the progression of Alzheimer's disease [PhD Dissertation]. Technion—Israel Institute of Technology.

Van Leeuwen, F.W. et al. Frameshift mutants of beta amyloid precursor protein and ubiquitin-B in Alzheimer's and Down patients. Science 279, 242-247 (1998).

Glickman MH, Ciechanover A. The ubiquitin-proteasome proteolytic pathway: destruction for the sake of construction. Physiol Rev. Apr. 2002; 82(2):373-428. doi: 10.1152/physrev.00027.2001. PMID: 11917093.

(Continued)

*Primary Examiner* — David Steadman
*Assistant Examiner* — Joseph R Spangler
(74) *Attorney, Agent, or Firm* — The Roy Gross Law Firm, LLC; Roy D. Gross

(57) ABSTRACT

The present invention is directed to a system including neurons over-expressing UBB+1, organized in a 3-dimensional culture, and method of using same. A process for making the system of the invention is also provided.

11 Claims, 22 Drawing Sheets
Specification includes a Sequence Listing.

(56) References Cited

PUBLICATIONS

Lindsten K, de Vrij FM, Verhoef LG, Fischer DF, van Leeuwen FW, Hol EM, Masucci MG, Dantuma NP. Mutant ubiquitin found in neurodegenerative disorders is a ubiquitin fusion degradation substrate that blocks proteasomal degradation. J Cell Biol. Apr. 29, 2002;157(3):417-27. doi: 10.1083/jcb.200111034. Epub Apr. 29, 2002. PMID: 11980917; PMCID: PMC2173284.

Krutauz D, Reis N, Nakasone MA, Siman P, Zhang D, Kirkpatrick DS, Gygi SP, Brik A, Fushman D, Glickman MH. Extended ubiquitin species are protein-based DUB inhibitors. Nat Chem Biol. Aug. 2014;10(8):664-70. doi: 10.1038/nchembio.1574. Epub Jul. 6, 2014. PMID: 24997605; PMCID: PMC4466224.

Gentier RJ, van Leeuwen FW. Misframed ubiquitin and impaired protein quality control: an early event in Alzheimer's disease. Front Mol Neurosci. Sep. 2, 2015;8:47. doi: 10.3389/fnmol.2015.00047. PMID: 26388726; PMCID: PMC4557111.

Choi SH, Kim YH, Quinti L, Tanzi RE, Kim Dy. 3D culture models of Alzheimer's disease: a road map to a "cure-in-a-dish". Mol Neurodegener. Dec. 9, 2016;11(1):75. doi: 10.1186/s13024-016-0139-7. PMID: 27938410; PMCID: PMC5148918.

Kim YH, Choi SH, D'Avanzo C, Hebisch M, Sliwinski C, Bylykbashi E, Washicosky KJ, Klee JB, Brustle O, Tanzi RE, Kim DY. A 3D human neural cell culture system for modeling Alzheimer's disease. Nat Protoc. Jul. 2015;10 (7):985-1006. doi: 10.1038/nprot.2015.065. Epub Jun. 11, 2015. PMID: 26068894; PMCID: PMC4499058.

Bishop P, Rocca D, Henley JM. Ubiquitin C-terminal hydrolase L1 (UCH-L1): structure, distribution and roles in brain function and dysfunction. Biochem J. Aug. 15, 2016;473(16):2453-62. doi: 10.1042/BCJ20160082. PMID: 27515257; PMCID: PMC4980807.

Zhang M, Cai F, Zhang S, Zhang S, Song W. Overexpression of ubiquitin carboxyl-terminal hydrolase L1 (UCHL1) delays Alzheimer's progression in vivo. Sci Rep. Dec. 3, 2014;4:7298. doi: 10.1038/srep07298. PMID: 25466238; PMCID: PMC4252905.

Lee YC, Hsu SD. Familial Mutations and Post-translational Modifications of UCH-L1 in Parkinson's Disease and Neurodegenerative Disorders. Curr Protein Pept Sci. 2017;18(7):733-745. doi: 10.2174/1389203717666160217143721. PMID: 26899237.

Osaka H, Wang YL, Takada K, Takizawa S, Setsuie R, Li H, Sato Y, Nishikawa K, Sun YJ, Sakurai M, Harada T, Hara Y, Kimura I, Chiba S, Namikawa K, Kiyama H, Noda M, Aoki S, Wada K. Ubiquitin carboxy-terminal hydrolase L1 binds to and stabilizes monoubiquitin in neuron. Hum Mol Genet. Aug. 15, 2003;12(16):1945-58. doi: 10.1093/hmg/ddg211. PMID: 12913066.

Das C, Hoang QQ, Kreinbring CA, Luchansky SJ, Meray RK, Ray SS, Lansbury PT, Ringe D, Petsko GA. Structural basis for conformational plasticity of the Parkinson's disease-associated ubiquitin hydrolase UCH-L1. Proc Natl Acad Sci U S A. Mar. 21, 2006;103(12):4675-80. doi: 10.1073/pnas.0510403103. Epub Mar. 1, 2006. Erratum in: Proc Natl Acad Sci U S A. Apr. 25, 2006;103(17):6776. PMID: 16537382; PMCID: PMC1450230.

Bett JS, Ritorto MS, Ewan R, Jaffray EG, Virdee S, Chin JW, Knebel A, Kurz T, Trost M, Tatham MH, Hay RT. Ubiquitin C-terminal hydrolases cleave isopeptide- and peptide-linked ubiquitin from structured proteins but do not edit ubiquitin homopolymers. Biochem J. Mar. 15, 2015;466(3):489-98. doi: 10.1042/BJ20141349. PMID: 25489924; PMCID: PMC4353193.

Liu Y, Fallon L, Lashuel HA, Liu Z, Lansbury PT Jr. The UCH-L1 gene encodes two opposing enzymatic activities that affect alpha-synuclein degradation and Parkinson's disease susceptibility. Cell. Oct. 18, 2002;111(2):209-18. doi: 10.1016/s0092-8674(02)01012-7. PMID: 12408865.

Sullivan PM, Mezdour H, Aratani Y, Knouff C, Najib J, Reddick RL, Quarfordt SH, Maeda N. Targeted replacement of the mouse apolipoprotein E gene with the common human APOE3 allele enhances diet-induced hypercholesterolemia and atherosclerosis. J Biol Chem. Jul. 18, 1997;272(29):17972-80. doi: 10.1074/jbc.272.29.17972. PMID: 9218423.

Case A, Stein RL. Mechanistic studies of ubiquitin C-terminal hydrolase L1. Biochemistry. Feb. 21, 2006;45(7):2443-52. doi: 10.1021/bi052135t. PMID: 16475834.

Alvarez-Erviti L, Seow Y, Yin H, Betts C, Lakhal S, Wood MJ. Delivery of siRNA to the mouse brain by systemic injection of targeted exosomes. Nat Biotechnol. Apr. 2011;29(4):341-5. doi: 10.1038/nbt.1807. Epub Mar. 20, 2011. PMID: 21423189.

Kumar P, Wu H, McBride JL, Jung KE, Kim MH, Davidson BL, Lee SK, Shankar P, Manjunath N. Transvascular delivery of small interfering RNA to the central nervous system. Nature. Jul. 5, 2007;448(7149):39-43. doi: 10.1038/nature05901. Epub Jun. 17, 2007. PMID: 17572664.

Tan Z, Sun X, Hou FS, Oh HW, Hilgenberg LG, Hol EM, van Leeuwen FW, Smith MA, O'Dowd DK, Schreiber SS. Mutant ubiquitin found in Alzheimer's disease causes neuritic beading of mitochondria in association with neuronal degeneration. Cell Death Differ. Oct. 2007;14(10):1721-32. doi: 10.1038/sj.cdd.4402180. Epub Jun. 15, 2007. PMID: 17571083; PMCID: PMC3258508.

PCT International Search Report for International Application No. PCT/IL2020/051002, mailed Jan. 20, 2021, 4pp.

PCT Written Opinion for International Application No. PCT/IL2020/051002, mailed Jan. 20, 2021, 6pp.

PCT International Preliminary Report on Patentability for International Application No. PCT/IL2020/051002, issued Mar. 15, 2022, 7pp.

Muñoz-Arellano, Ana Joyce, et al. "Different expression levels of human mutant ubiquitin B+ 1 (UBB+ 1) can modify chronological lifespan or stress resistance of *Saccharomyces cerevisiae*." Frontiers in Molecular Neuroscience 2018, 11: 200. doi: 10.3389/fnmol.2018.00200. PMID: 29950972; PMCID: PMC6008557.

Banasiak, Katarzyna, Natalia A. Szulc, and Wojciech Pokrzywa. "The dose-dependent pleiotropic effects of the UBB+ 1 ubiquitin mutant." Frontiers in Molecular Biosciences 8 (2021): 650730. doi: 10.3389/fmolb.2021.650730. PMID: 33842548; PMCID: PMC8032880.

Jung, Byung-Kwon, Chul-Woo Park, and Kwon-Yul Ryu. "Temporal downregulation of the polyubiquitin gene Ubb affects neuronal differentiation, but not maturation, in cells cultured in vitro." Scientific Reports 8.1 (2018): 2629. https://doi.org/10.1038/s41598-018-21032-6.

Schmidt, Marlene F., et al. "Ubiquitin signalling in neurodegeneration: mechanisms and therapeutic opportunities." Cell Death & Differentiation 28.2 (2021): 570-590. https://doi.org/10.1038/s41418-020-00706-7.

Muñoz-Arellano, A.J., Chen, X., Molt, A., Meza, E. and Petranovic, D., 2018. Different expression levels of human mutant ubiquitin B+ 1 (UBB+ 1) can modify chronological lifespan or stress resistance of *Saccharomyces cerevisiae*. Frontiers in Molecular Neuroscience, 11, p. 200.—15pp.

Banasiak, K., Szulc, N.A. and Pokrzywa, W., 2021. The dose-dependent pleiotropic effects of the UBB+ 1 ubiquitin mutant. Frontiers in Molecular Biosciences, 8, p. 650730.—8pp.

Jung, B.K., Park, C.W. and Ryu, K.Y., 2018. Temporal downregulation of the polyubiquitin gene Ubb affects neuronal differentiation, but not maturation, in cells cultured in vitro. Scientific Reports, 8(1), p. 2629.—10pp.

Schmidt, M.F., Gan, Z.Y., Komander, D. and Dewson, G., 2021. Ubiquitin signalling in neurodegeneration: mechanisms and therapeutic opportunities. Cell Death & Differentiation, 28(2), pp. 570-590.—21pp.

* cited by examiner

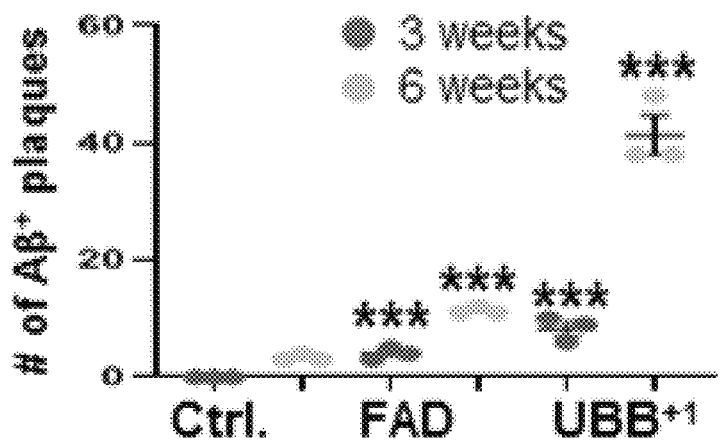
FIGURE 1C
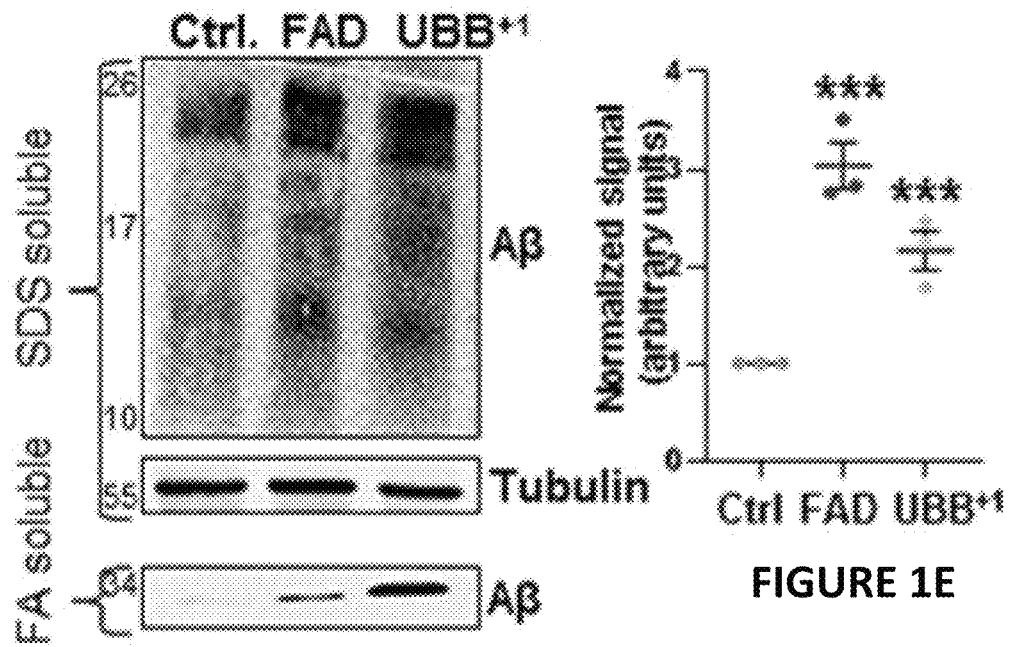
FIGURE 1D
FIGURE 1E
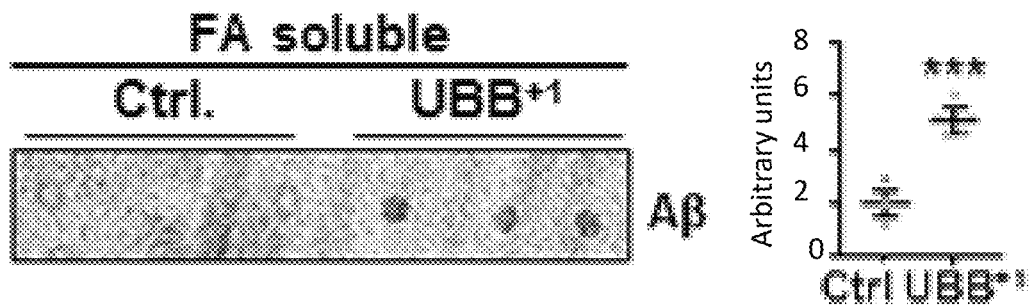
FIGURE 1F

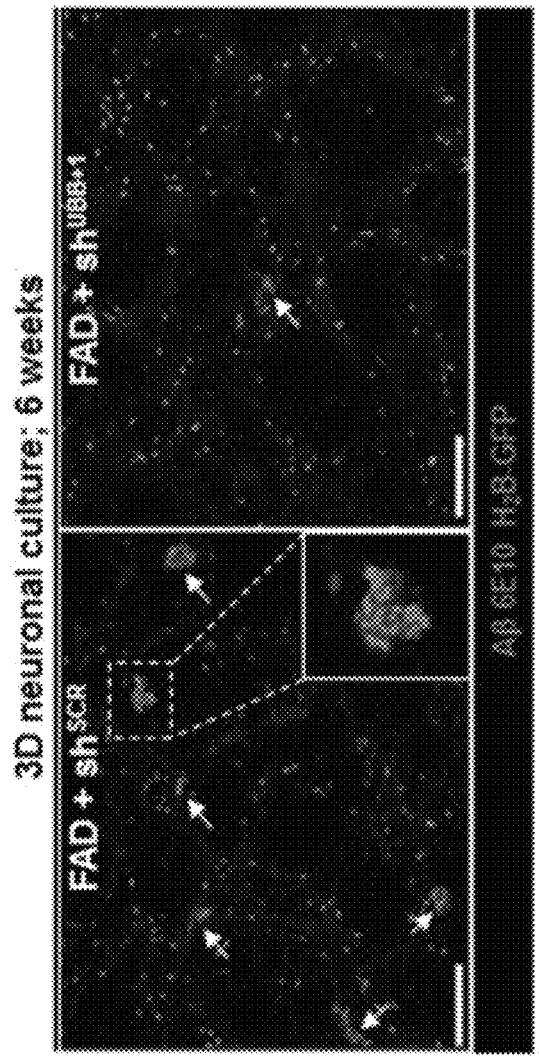
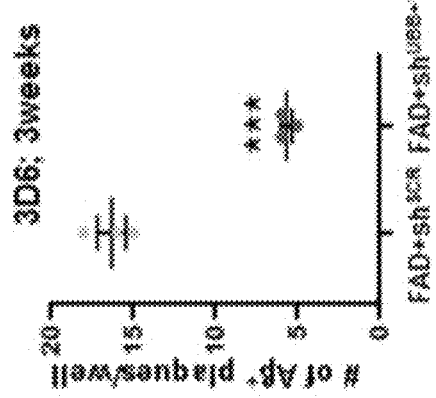
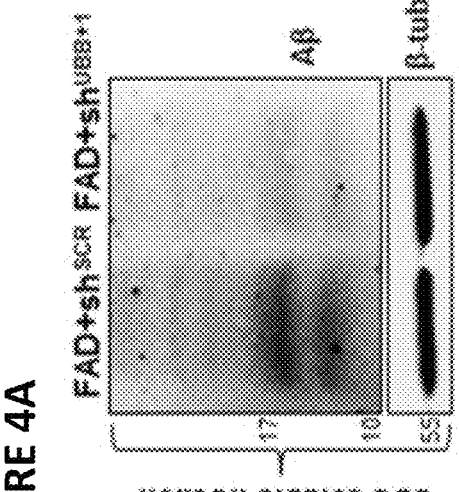
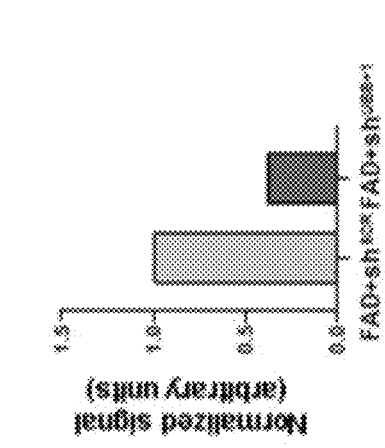
FIGURE 4A
FIGURE 4B
FIGURE 4C
FIGURE 4D
FIGURE 4E

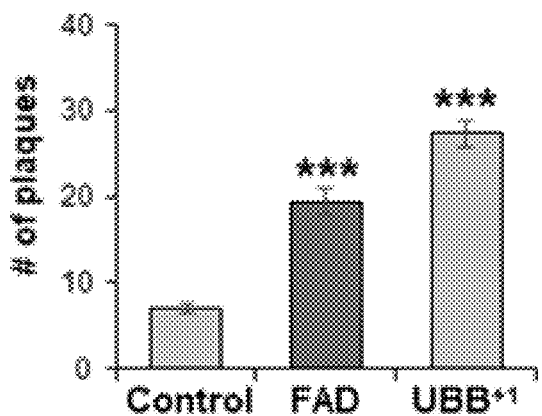
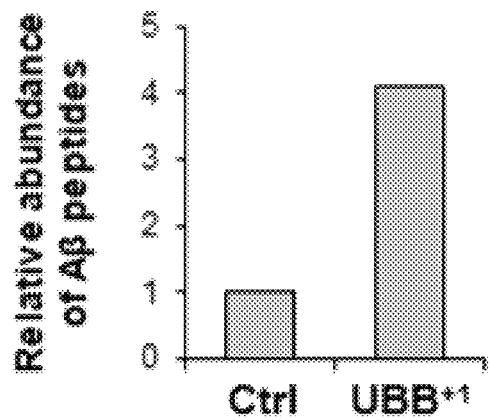
FIGURE 7C
FIGURE 7D
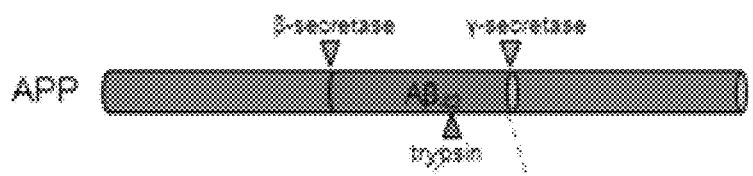
| Samples | Semi-tryptic peptide identified through MS/MS |
|---|---|
| Control | - |
| UBB+1 | GAIIGLMVGGVVIA *<br>SEQ ID NO: 6 |
* Semi-tryptic peptide "GAIIGLMVGGVVIA" identified in UBB+1 sample only
FIGURE 7E

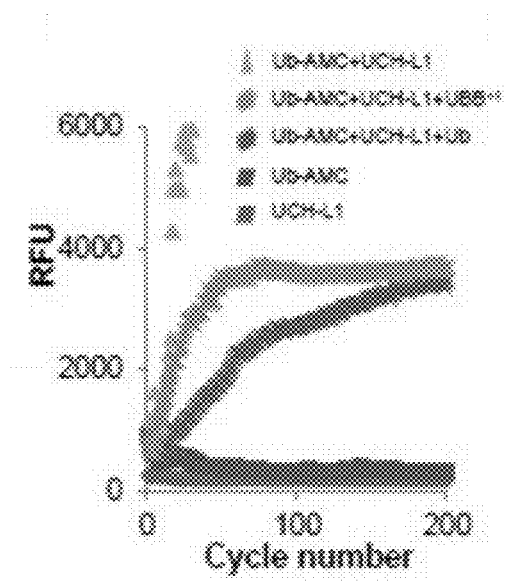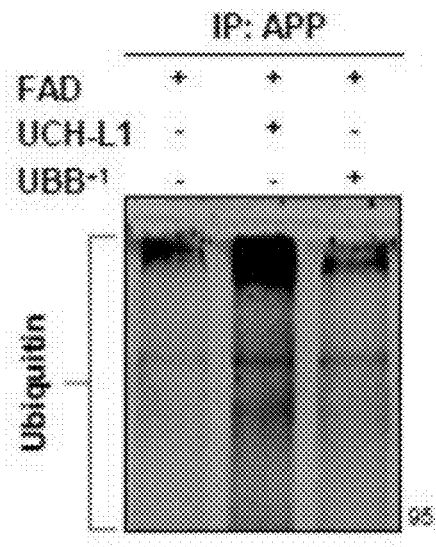
FIGURE 8D
FIGURE 8E
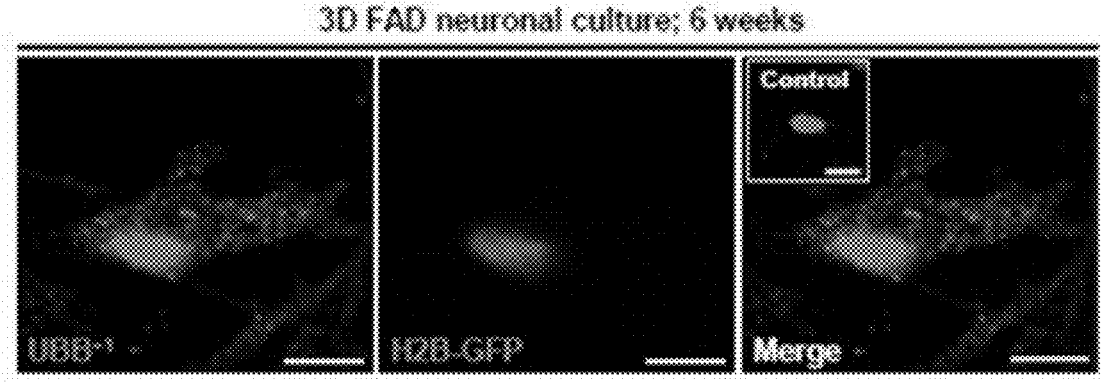
FIGURE 9A
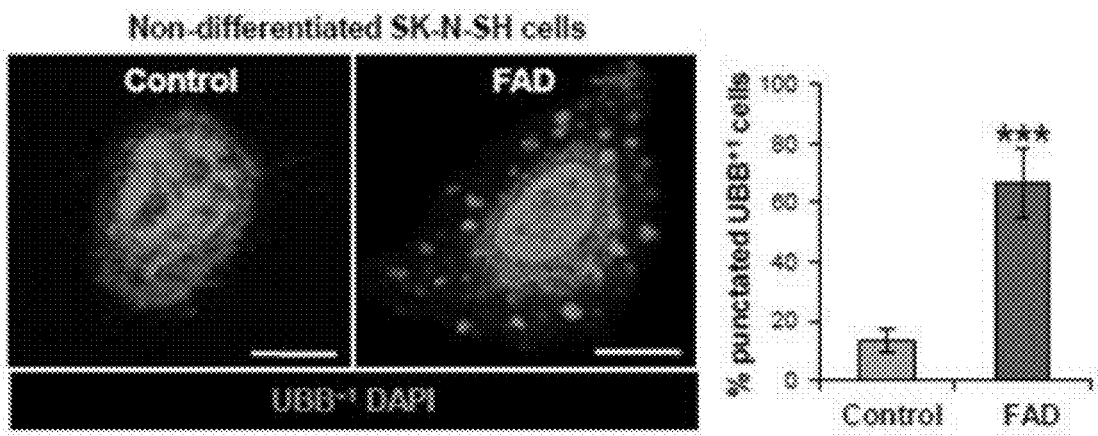
FIGURE 9B
FIGURE 9C

FIGURE 9D  FIGURE 9E

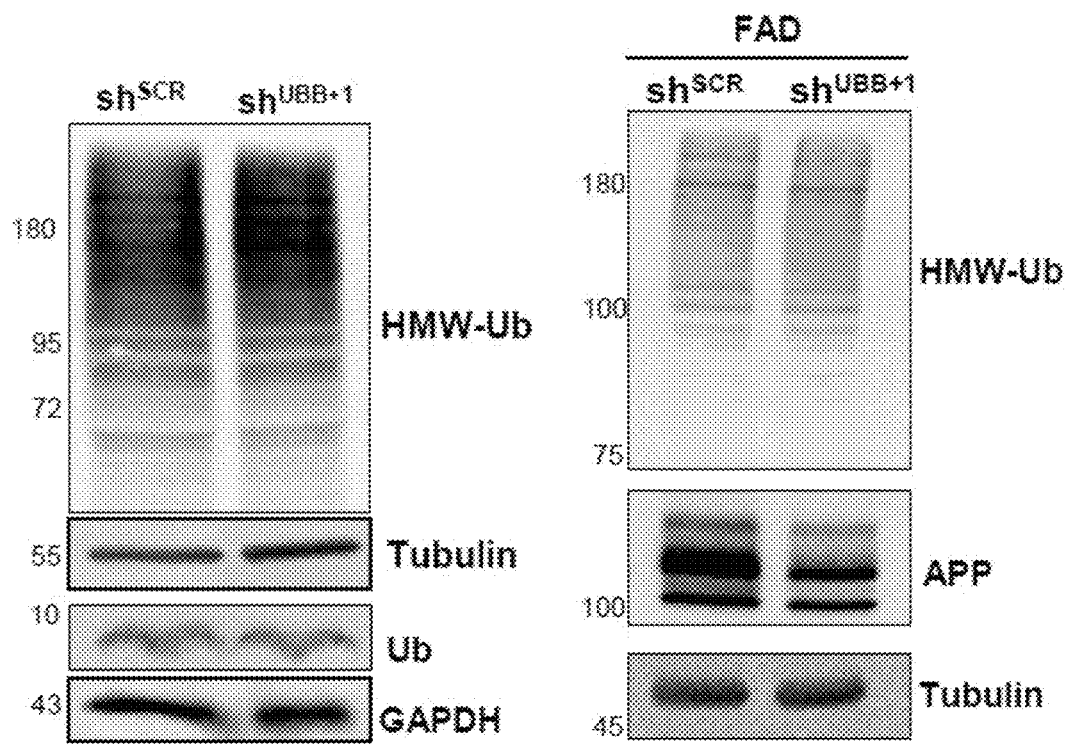
FIGURE 11C
FIGURE 11D
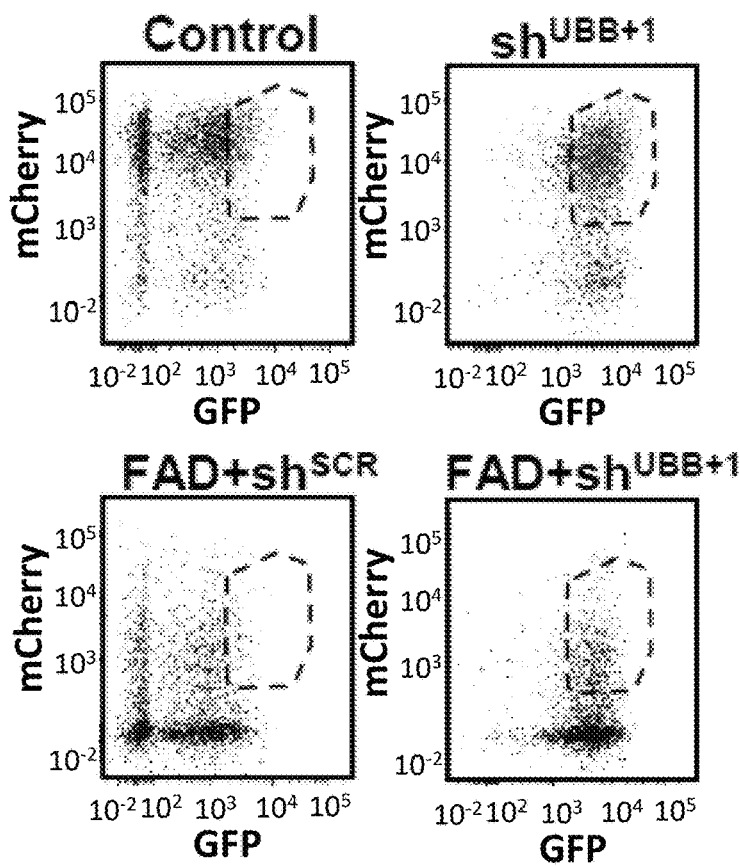
FIGURE 11E

SEQUENCE LISTING

```
<160> NUMBER OF SEQ ID NOS: 9

<210> SEQ ID NO 1
<211> LENGTH: 95
<212> TYPE: PRT
<213> ORGANISM: Artificial Sequence
<220> FEATURE:
<223> OTHER INFORMATION: Synthetic

<400> SEQUENCE: 1

Met Gln Ile Phe Val Lys Thr Leu Thr Gly Lys Thr Ile Thr Leu Glu
1               5                   10                  15

Val Glu Pro Ser Asp Thr Ile Glu Asn Val Lys Ala Lys Ile Gln Asp
            20                  25                  30
```

```
Lys Glu Gly Ile Pro Pro Asp Gln Gln Arg Leu Ile Phe Ala Gly Lys
            35                  40                  45

Gln Leu Glu Asp Gly Arg Thr Leu Ser Asp Tyr Asn Ile Gln Lys Glu
        50                  55                  60

Ser Thr Leu His Leu Val Leu Arg Leu Arg Gly Tyr Ala Ser Leu Arg
65                  70                  75                  80

Glu Asp Pro Asp Arg Gln Asp His His Pro Gly Ser Gly Ala Gln
                85                  90                  95

<210> SEQ ID NO 2
<211> LENGTH: 58
<212> TYPE: DNA
<213> ORGANISM: Artificial Sequence
<220> FEATURE:
<223> OTHER INFORMATION: Synthetic

<400> SEQUENCE: 2
cgcgggtatg ctagccttcg tgaagctcga gcttcacgaa ggctagcata ccttttttg      58

<210> SEQ ID NO 3
<211> LENGTH: 58
<212> TYPE: DNA
<213> ORGANISM: Artificial Sequence
<220> FEATURE:
<223> OTHER INFORMATION: Synthetic

<400> SEQUENCE: 3
aattcaaaaa ggtatgctag ccttcgtgaa gctcgagctt cacgaaggct agcatacc      58

<210> SEQ ID NO 4
<211> LENGTH: 57
<212> TYPE: DNA
<213> ORGANISM: Artificial Sequence
<220> FEATURE:
<223> OTHER INFORMATION: Synthetic

<400> SEQUENCE: 4
gtcacagaga gatagcgcgt gtgtctcgag acacacgcgc tatctctctg tttttttg      57

<210> SEQ ID NO 5
<211> LENGTH: 58
<212> TYPE: DNA
<213> ORGANISM: Artificial Sequence
<220> FEATURE:
<223> OTHER INFORMATION: Synthetic

<400> SEQUENCE: 5
aattcaaaaa acagagagat agcgcgtgtg tctcgagaca cacgcgctat ctctctgt      58

<210> SEQ ID NO 6
<211> LENGTH: 14
<212> TYPE: PRT
<213> ORGANISM: Artificial Sequence
<220> FEATURE:
<223> OTHER INFORMATION: Synthetic

<400> SEQUENCE: 6

Gly Ala Ile Ile Gly Leu Met Val Gly Gly Val Val Ile Ala
1               5                   10

<210> SEQ ID NO 7
<211> LENGTH: 21
<212> TYPE: DNA
<213> ORGANISM: Artificial Sequence
```

```
<220> FEATURE:
<223> OTHER INFORMATION: Synthetic

<400> SEQUENCE: 7
ggtatgctag ccttcgtgaa g                                              21

<210> SEQ ID NO 8
<211> LENGTH: 29
<212> TYPE: PRT
<213> ORGANISM: Artificial Sequence
<220> FEATURE:
<223> OTHER INFORMATION: Synthetic

<400> SEQUENCE: 8

Tyr Thr Ile Trp Met Pro Glu Asn Pro Arg Pro Gly Thr Pro Cys Asp
1               5                   10                  15

Ile Phe Thr Asn Ser Arg Gly Lys Arg Ala Ser Asn Gly
            20                  25

<210> SEQ ID NO 9
<211> LENGTH: 21
<212> TYPE: DNA
<213> ORGANISM: Artificial Sequence
<220> FEATURE:
<223> OTHER INFORMATION: Synthetic

<400> SEQUENCE: 9
ggtatgctag ccttcgtgaa g                                              21
```

SYSTEMS AND METHODS FOR IN-VITRO MODELING OF NEURODEGENERATIVE DISEASES

CROSS-REFERENCE TO RELATED APPLICATIONS

This application is a National Phase of PCT Patent Application No. PCT/IL2020/051002 having International filing date of Sep. 13, 2020, which claims the benefit of priority of U.S. Provisional Patent Application No. 62/899,260, titled "SYSTEMS AND METHODS FOR IN-VITRO MODELING OF NEURODEGENERATIVE DISEASES", filed on Sep. 12, 2019, the contents of which are incorporated herein by reference in their entirety.

FIELD OF INVENTION

The present invention is in the field of in-vitro analysis of neurodegenerative diseases.

BACKGROUND

The ubiquitin-proteasome system (UPS) is the primary selective degradation system in eukaryotes. A ubiquitin chain covalently attached to lysine residues in substrate proteins is the recognition signal for proteasomal degradation. Ubiquitin-B+1 (UBB+1) is the only ubiquitin mutant that has ever been reported. This unique mutant preserves its ubiquitin domain but has a non-hereditary frameshift mutation that completely abolishes the ability of UBB+1 to modify proteins. Intriguingly, this mutant has been found in 100% of Alzheimer's disease (AD) patients but due to inadequate human AD models, incredibly little is known regarding its function and contribution to AD.

AD is a widespread, devastating neurodegenerative disease and the predominant form of dementia. AD is divided into two forms, Familial (FAD), which is the rare form of the disease (~2% of total cases), and Sporadic AD (SAD), the common form of the disease (~98% of total cases). AD displays two pathological characteristics: amyloid-β (Aβ) plaques and neurofibrillary tangles (NFTs), both of which are aggregates of damaged proteins that have failed to be properly cleared. While much knowledge has been attained regarding the direct genetic mutations resulting in formation of Aβ plaques and NFTs, incredibly little is known regarding the contribution of defective clearance mechanisms to the pathogenesis of AD.

To date, the cause for SAD is still unknown, there is no clear therapeutic option and attempts to use mouse models to study the disease have failed since they do not fully recapitulate the human condition. Thus, currently one of the biggest obstacles is the lack of an in vitro model that recapitulates the characteristics of AD.

SUMMARY

The present invention provides an in-vitro system for modeling neurodegenerative diseases and methods of use thereof. Processes for making the system are also provided.

According to a first aspect, there is provided an in-vitro system comprising a three-dimensional culture, wherein the culture comprises a cell population, and wherein at least 70% of the cell population overexpress a Ubiquitin-B+1 (UBB+1) polypeptide.

According to another aspect, there is provided a method for determining the efficacy of a test substance on a neurodegenerative disease, the method comprising the steps of: (a) contacting the in-vitro system of the invention with an effective amount of a test substance, and (b) determining in the system a responsive change in at least one characteristic of a neurodegenerative disease, thereby determining the test substance efficacy on the neurodegenerative disease.

According to another aspect, there is provided a process for preparing the in-vitro system of the invention, the process comprising: (a) culturing neuronal stem cells or neuronal progenitor cells, (b) transducing an exogenous gene to the cells, so to overexpress UBB+1 in said cells, and (c) cultivating the cells to a cell population organized in a three-dimensional culture.

According to another aspect, there is provided an RNA interfering (RNAi) oligonucleotide consisting of 21 to 25 contiguous nucleotides comprising the nucleic acid sequence GGTATGCTAGCCTTCGTGAAG (SEQ ID NO: 7).

According to another aspect, there is provided a pharmaceutical composition comprising the RNAi oligonucleotide of the invention and an acceptable carrier.

According to another aspect, there is provide a method for treating a subject afflicted with AD, the method comprising administering to the subject a therapeutically effective amount of any one of: (a) the RNAi oligonucleotide of the invention; or (b) the pharmaceutical composition of the invention, thereby treating the subject afflicted with AD.

In some embodiments, the cell population overexpressing a Ubiquitin-B+1 (UBB+1) polypeptide is by a genetically modified neurons comprise an exogenous polynucleotide sequence encoding UBB+1 polypeptide.

In some embodiments, the polypeptide sequence of the UBB+1 is set forth in SEQ ID NO: 1.

In some embodiments, the culture further comprises an amyloid plaque, a tau protein aggregation, or both.

In some embodiments, the three-dimensional culture has a width of 100-300 μm.

In some embodiments, the three-dimensional culture has a width of 0.5-4.5 mm.

In some embodiments, the culture further comprises a scaffold, and wherein the cell population is embedded on or in the scaffold.

In some embodiments, the scaffold is a hydrogel.

In some embodiments, the characteristic is selected from the group consisting of: axonal swelling, axonal segment breaks, amyloid Aβ plaques, a tau protein aggregation, C99 fragment accumulation, tau protein aggregation, neuronal apoptosis, F-Actin bundles formation, and any combinations thereof.

In some embodiments, the responsive change comprises a reduction, inhibition, or suppression of the characteristic.

In some embodiments, the contacting is prior to cell differentiation, during cell differentiation, after cell differentiation, or any combination thereof.

In some embodiments, the neurodegenerative disease is Alzheimer's disease.

In some embodiments, the Alzheimer's disease is sporadic Alzheimer's disease.

In some embodiments, the transducing is preformed prior to cultivating the cells to a cell population organized in a three-dimensional culture.

In some embodiments, cultivating the cells to a cell population organized in a three-dimensional culture is for a duration of 3-12 weeks.

In some embodiments, the transducing is by a viral-based vector (e.g., lentivirus).

In some embodiments, the transducing is prior to cell differentiation, during cell differentiation, after cell differentiation, or any combination thereof.

In some embodiments, the process is for producing a sporadic Alzheimer's disease (SAD) model. In some embodiments, the cultivation of the process disclosed herein, is on a scaffold sufficient for receiving a cell population organized in a three-dimensional culture. In some embodiments, the cultivating is on a hydrogel.

In some embodiments, the RNAi oligonucleotide consists of SEQ ID NO: 6.

In some embodiments, the RNAi oligonucleotide comprises a chemically modified backbone.

In some embodiments, the chemically modified backbone comprises: a phosphate-ribose backbone, a phosphate-deoxyribose backbone, a phosphorothioate-deoxyribose backbone, a 2'-O-methyl-phosphorothioate backbone, a phosphorodiamidate morpholino backbone, a peptide nucleic acid backbone, a 2-methoxyethyl phosphorothioate backbone, an alternating locked nucleic acid backbone, a phosphorothioate backbone, N3'-P5' phosphoroamidates, 2'-deoxy-2'-fluoro-β-d-arabino nucleic acid, cyclohexene nucleic acid backbone nucleic acid, tricyclo-DNA (tcDNA) nucleic acid backbone, and a combination thereof.

In some embodiments, the pharmaceutical composition is for use in the treatment of AD.

In some embodiments, the administering comprises intravenously administration.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

FIGS. 1A-1I include a scheme, graphs and micrographs showing the expression of $UBB^{+1}$ induces Alzheimer's disease pathology in a 3D human neuronal system. (1A) Schematic non-limiting experimental approach for 2D processing and 3D culturing of ReN cells. (1B) Representative immunofluorescent (IF) micrographs showing Aβ deposits in three- and six-week differentiated control, $APP^{SL}$-$PSNE1^{ΔE9}$ (FAD) and $UBB^{+1}$ 3D cultures. White arrows indicate extracellular Aβ deposits. (1C) Quantification of the mean total number of extracellular Aβ deposits/well (all plaques in the entire well were counted) in control, FAD and $UBB^{+1}$ cultures after three and six weeks post embedding [n=3 independent wells]. (1D) Immunoblots of solubilized aggregates isolated from six week old 3D-differentiated ReN cells showing Aβ-trimers and tetramers in SDS-soluble fraction and in the formic acid (FA)-soluble fraction from control, FAD and $UBB^{+1}$ cultures. β-tubulin was used as loading control. (1E) Quantification of three independent immunoblots of SDS-soluble fractions from six-week-old cultures in control, FAD and $UBB^{+1}$ [n=3 independent experiments]. (1F) Dot-blot analysis and quantification of Aβ (6E10) in FA-solubilized aggregates isolated from six-week-old 3D-differentiated control and $UBB^{+1}$ cultures [n=3 independent samples]. (1G) Representative immunohistochemistry (IHC) micrographs and quantification of eight-week-old 3D cultures stained against p-tau demonstrating increased neurofibrillary tangles (NFTs) in FAD and $UBB^{+1}$ cultures. Black arrowheads indicate NFT morphology [n=3 independent wells]. (1H) Dot-blot analysis of p-tau (PHF-1) and quantification of sarkosyl-insoluble fractions isolated from eight-week-old control and $UBB^{+1}$ cultures [n=3 independent samples]. (1I) Representative Cryo-TEM images of sarkosyl-insoluble fractions (SIF) extracted from eight-week-old $UBB^{+1}$ cultures (from h), demonstrating a periodic structure of tau filaments. Black arrowheads indicate filaments [n=4 independent samples]. P values were determined by unpaired two-tailed Student's t test where P<0.01 and *P<0.001. Error bars represent±s.e.m. Images are representative of at least three independent samples. All experiments were repeated at least twice and performed in experimental triplicates. Scale bars: 50 μm (1B, 1G), 50 nm (1I).

FIGS. 4A-4I include micrographs and graphs showing that silencing UBB$^{+1}$ expression decreases Alzheimer's disease pathology in a 3D human neuronal system. (4A) Representative image of six-week-old 3D cultures of FAD with shRNA-scrambled control (denoted FAD+shSCR) or FAD with shRNA against UBB$^{+1}$ (denoted FAD+shUBB$^{+1}$), immunostained for extracellular Aβ deposits (6E10; white arrows). Inset shows zoom-in of single Aβ plaque. (4B) Quantification of 6E10 positive Aβ deposits in six-week-old 3D FAD+shSCR and FAD+shUBB$^{+1}$ cultures [n=3 independent wells]. (4C) Quantification of 3D6 positive Aβ deposits in 3-week-old FAD+shSCR or FAD+shUBB$^{+1}$ cultures [n=3 independent wells]. (4D) Immunoblot of Aβ (6E10) in aggregates isolated from six-week-old 3D cultures. Amyloid trimers and tetramers were detected in SDS-soluble fractions. β-tubulin was used as loading control. (4E) Quantification of Aβ in d by densitometry. (4F) Dot-blot analysis and quantification of Aβ (6E10) in FA-solubilized aggregates isolated from six-week-old 3D FAD+shSCR or FAD+shUBB$^{+1}$ cultures [n=3 independent samples]. (4G) Dot-blot analysis of p-tau (PHF-1) and quantification of FA-solubilized fractions isolated from six-week-old 3D FAD+shSCR or FAD+shUBB$^{+1}$ cultures [n=3 independent samples]. (4H) IHC representative images of p-tau$^+$ cells showing NFT morphology (black arrows) in 3D FAD+shSCR and FAD+shUBB$^{+1}$ cultures after eight weeks differentiation. (4I) Quantification of p-tau$^+$ cells in h [n=3 independent samples]. P values were determined by unpaired two-tailed Student's t test where P<0.01 and *P<0.001. Error bars represent±s.e.m. Scale bars: 50 μm (4A, 4D). Images are representative of three independent wells. All experiments were repeated twice.

FIGS. 7A-7E include micrographs, graphs and a scheme showing that the expression of UBB$^{+1}$ is sufficient to induce Alzheimer's disease pathology in 3D human neuronal culture. (7A) Immunohistochemistry on 6 week old 3D cultures utilizing anti-Aβ 6E10 antibody demonstrates increased Aβ pathology in UBB$^{+1}$ cultures. (7B) Representative images of amyloid plaques in 3D differentiated control and UBB$^{+1}$ ReN cells using Thioflavin S dye. (7C) Quantification of total number of Thioflavin S plaques in control, FAD and UBB$^{+1}$ 3D cultures after six weeks differentiation. (7D) SDS soluble fractions extracted from 6 week old differentiated ReN cells showing a significant increase in a representative Aβ$_{42}$ tryptic peptide in UBB$^{+1}$ in contrast to control as determined by MS/MS. Comparison was done by calculating the peak area of each peptide. (7E) The semi tryptic peptide GAIIGLMVGGVVIA (SEQ ID NO: 6) was identified only in SDS soluble fractions extracted from 6-week-old UBB$^{+1}$ differentiated ReN cells. Schematic of APP primary sequence highlighting the peptide generated by serial cleavage of γ-secretase and trypsin. P values were determined by unpaired two-tailed Student's t test where ***P<0.001. Error bars represent±s.e.m. All images are representative of three independent cultures and experiments were repeated twice. Scale bars: 20 μm (7A, 7C).

FIGS. 8A-8E include micrographs and a graph showing that UBB$^{+1}$ binds UCH-L1 and interferes with its ligase activity. (8A) Co-purification of recombinant GST-UCH-L1 with His-UBB$^{+1}$ or His-ubiquitin by nickel affinity purification, showing a direct interaction between UCH-L1 and UBB$^{+1}$. In, input; FT, flow through; W, wash; E, elution. Proteins were visualized by Coomassie staining. (8B) A reciprocal assay utilizing glutathione beads to isolate GST-UCH-L1 indicating that ubiquitin and UBB$^{+1}$ can both bind to UCH-L1 simultaneously. In, input; FT, flow through; W, wash; E, elution. (8C) In vitro ligase assay performed by UCH-L1 on ubiquitin-AMC produces ubiquitin dimers after three hours incubation (left lane). Production of ubiquitin dimers is increased when ubiquitin is added to the reaction Note that UBB$^{+1}$ is not able to increase ubiquitin dimer production, despite its ability to bind simultaneously with ubiquitin to UCH-L1 (panel b). (8D) Ubiquitin-AMC hydrolysis by UCH-L1 is inhibited by the presence of ubiquitin or UBB$^{+1}$. Data is shown as Relative Fluorescence Units (RFU) over cycles of 15 minutes each. (8E) APP ubiquitination is conversely affected by UCH-L1 and UBB$^{+1}$. Immunoprecipitation of APP from HEK 293 cells transfected with FAD together with UBB$^{+1}$ or UCH-L1 tested for polyubiquitination upon resolving by SDS PAGE followed with anti-ubiquitin immunoblotting. APP ubiquitination diminishes upon expression of UBB$^{+1}$. Experiments were repeated twice.

FIGS. 9A-9F includes micrographs and graphs showing that FAD enhances UBB$^{+1}$ accumulation. (9A) Representative images of six-week-old FAD 3D cultures stained against UBB$^{+1}$ showing punctated UBB$^{+1}$ pattern throughout the cell body. Inset shows control culture stained for UBB$^{+1}$. (9B) Immunofluorescence of control and FAD SK-N-SH cells stained with anti UBB$^{+1}$. (9C) Quantification of punctated UBB$^{+1}$ positive cells shows a significant increase in FAD cells compared to control. (9D) Immunofluorescence of differentiated SK-N-SH neurons stained with UBB$^{+1}$. (9E) Quantification of UBB$^{+1}$ punctated cells reveals a significant increase in FAD cells compared to control. (9F) Western blot of control and FAD SK-N-SH cells utilizing anti-UBB$^{+1}$ antibody. B-actin was used as a loading control. P values were determined by unpaired two-tailed Student's t test where *P<0.05, P<0.01 and *P<0.001. Error bars represent±s.e.m. All images are representative of three independent cultures and experiments were repeated at least twice. Scale bars: 20 µm (9A) and 10 µm (9B, 9D).

FIGS. 11A-11K include sequences, graphs, and micrographs showing the establishment of RNA interference (RNAi) for UBB 1 in 3D cultures. (11A) Schematic of RNAi design for endogenous and ectopic UBB 1 sequences. For the generation of a shRNA/miRNA the inventors encompassed a perfect seed sequence (2), corresponding to positions 2-8, which is critical for binding the target mRNA, displayed unpairing at positions 9-11 (3), but perfectly matched D79S, as demonstrated by the complete sequence similarity at positions 12-20 (4) and exhibited absolutely no binding to UBB transcript (or to any additional mRNA) Thus, this specific shRNA could potentially silence the expression of both endogenous and ectopic UBB$^{+1}$ without affecting ubiquitin levels. (11B) Immunoblot and densitometry of HEK293FT cells transfected with either UBB$^{+1}$ or UBB$^{+1wt}$ together with shUBB$^{+1}$ or shSCR. (11C) Immunoblot of total ubiquitin in HEK293FT cells carrying shRNAUBB$^{+1}$ or scrambled control. Both HMW and mono ubiquitin were tested showing that shUBB$^{+1}$ has no effect on total ubiquitin levels in the cell. (11D) Immunoblots of HMW ubiquitin conjugates and of APP in HEK293FT cells carrying FAD+shUBB$^{+1}$ or FAD+shSCR shUBB$^{+1}$ decreases APP levels but did not affect ubiquitin in conjugates. (11E) FACS plots of ReN cells that were transduced with polycistronic H2B-GFP and mCherry lentiviral vectors: Control (scrambled shRNA-H$_2$B-GFP+mCherry), shUBB$^{+1}$ (shUBB$^{+1}$-H2B-GFP+mCherry), FAD (APP$^{SL}$-PSEN1$^{\Delta E9}$-mCherry+scrambled-H2B-GFP) and FAD+shUBB$^{+1}$ (APP$^{SL}$-PSEN1$^{\Delta E9}$-mCherry+shUBB$^{+1}$-H2B-GFP). Cells were then enriched based on GFP and mCherry signals by FACS Black dotted boxes indicate sorted cell population (top 2%). (11F) Immunofluorescence of 3D neurons expressing shUBB$^{+1}$ showing a decrease in UBB$^{+1}$ protein levels compared to scrambled control. (11G) Dot blot analysis of FA-soluble fraction extracted from six week old FAD+shSCR or FAD+shUBB$^{+1}$ cultures blotted against UBB 1 showing decreased levels of UBB$^{+1}$. (11H) Thioflavin S staining in six week old FAD+shSCR or FAD+shUBB$^{+1}$ cultures. (11I) Quantification of Aβ plaques from i [n=6 independent wells]. (11J) Mean number of small and large Aβ deposits in FAD+shSCR and FAD+shUBB$^{+1}$ cultures n=3 independent wells. (11K) Dot-blot analysis of sarkosyl insoluble fraction extracted from six week old 3D cultures stained for p-tau (PHF1) or tau (MC1). P values were determined by unpaired two tailed Student's t test where **P<0.01. Error bars represent±s.e.m. Images are representative of three independent cultures and experiments were repeated twice. Scale bars: 20 µm (11D-11E), 10 µm (11G).

DETAILED DESCRIPTION

Figure 1A:
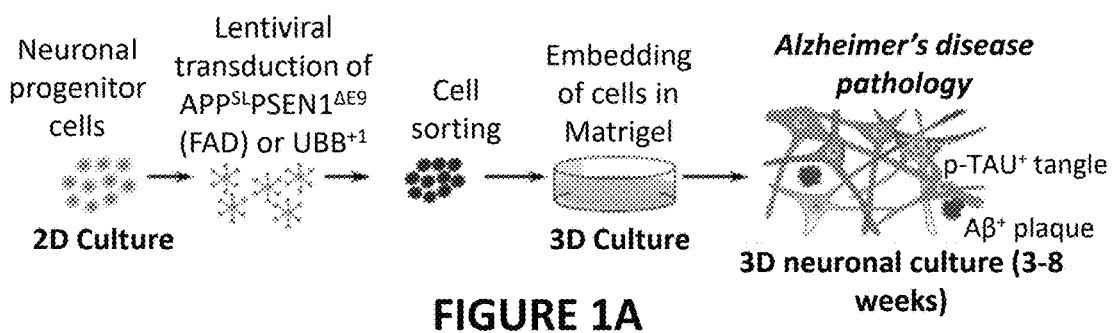

The present invention, in some embodiments, provides an in-vitro system comprising a three-dimensional (3D) culture comprising genetically modified neurons expressing a Ubiquitin-B+1 (UBB+1) gene, and methods and kits for use thereof. Processes for making the in-vitro system are also provided.

According to some embodiments, the invention is based, in part, on the surprising findings that an in-vitro model for Alzheimer's disease (AD) can be established based on the sole expression of UBB+1 in 3D cultured neuron cells.

According to one embodiment, there is provided an in-vitro system comprising a 3D culture, wherein the culture comprises a cell population, wherein all cells are neurons over-expressing a UBB+1 polypeptide.

The term "cell culture" or "culture" refers to the maintenance of cells in an artificial environment (e.g., an in vitro), under controlled conditions which are compatible with cell growth. It is to be understood, however, that the term "cell culture" is a generic term and may be used to encompass the cultivation not only of individual or cells, but also of tissues, organs, organ systems or whole organisms, for which the terms "tissue culture," "organ culture", or "organ system culture" may occasionally be used interchangeably with the term "cell culture."

According to some embodiments, a "three-dimensional cell culture" or "3D culture" refers to a culture in which the cells are allowed to grow in more than one layer. In some embodiments, cells within the 3D cell culture are contacted with oxygen, hormones and nutrients. In some embodiments, a 3D cell culture is characterized by cell-cell and cell-extracellular matrix (ECM) interactions. In some embodiments, cells within a 3D cell culture reside on, within, or both, in a scaffold that allows the establishment of various local microenvironments. In some embodiments, cells are embedded in a hydrogel. In some embodiments, the 3D culture allows quantitative measurements of network formation, such as structure or spatial interactions, which cannot be reproduced in conventional two-dimensional (2D) cell cultures.

As used herein, the term "scaffold" refers to a structure comprising a surface suitable for adherence, attachment, anchoring, maturation, differentiation, proliferation, or any combination thereof, of cells. A scaffold may further provide mechanical stability and support. A scaffold may be in a particular shape or form so as to influence or delimit a 3D shape or form assumed by a population of differentiating cells. As used herein 3D shapes include films, ribbons, cords, sheets, flat discs, cylinders, spheres, 3D amorphous shapes, or others.

The scaffold, in one embodiment, is a porous matrix. In another embodiment, the porous scaffold comprises at least 50% porosity. In another embodiment, the porous scaffold comprises at least 60% porosity, at least 70% porosity, at least 75% porosity, at least 80% porosity, at least 85% porosity, at least 90% porosity, at least 92% porosity, or at least 95% porosity, and any value and range therebetween. In another embodiment, the porous scaffold comprises 45-55% porosity, 50-70% porosity, 60-80% porosity, 75-90% porosity, or 80-97% porosity. Each possibility represents a separate embodiment of the invention.

In another embodiment, the porous scaffold comprises pores having a diameter of at least 100 μm. In another embodiment, the porous scaffold comprises pores having a diameter of at least 120 μm. In another embodiment, the porous scaffold comprises pores having a diameter of at least 150 μm. In another embodiment, the porous scaffold comprises pores having a diameter of 100-900 μm. In another embodiment, the porous scaffold comprises pores having a diameter of 120-900 μm. In another embodiment, the porous scaffold comprises pores having a diameter of 120-850 μm. In another embodiment, the porous scaffold comprises pores having a diameter of 150-800 μm. In another embodiment, the porous scaffold comprises pores having a diameter of 200-800 μm. In another embodiment, the porous scaffold comprises pores having a diameter of 220-750 μm. Each possibility represents a separate embodiment of the invention.

As used herein, the term "hydrogel" is intended to indicate a scaffold comprised of a network of proteins, preferably fibrous proteins, which are dispersed in an aqueous solvent, preferably a suitable cell culture medium.

In some embodiments, the hydrogel can comprise a hydrophilic component and an adhesive component. The hydrophilic component can comprise, e.g., a polyalkylene glycol (PAG), hyaluronic acid, chitosan and any combination thereof. The adhesive component of the hydrogel can comprise, gelatin, collagen, laminin, fibronectin, vitronectin and any combination thereof. The molar ratio of hydrophilic component to adhesive component in the hydrogel can be from 500:1 to 1:500, including any ratio between these values not explicitly recited here (e.g., 300:1, 100:1, 50:1, 1:250, 1:100, etc.). The weight ratio of the hydrophilic component to adhesive component in the hydrogel can be from 1,500:1 to 1:1,500, including any ratio between these values not explicitly recited here (e.g., 1,300:1, 1,000:1, 1:1,000, etc.).

In some embodiments, the hydrogel may comprise any extracellular matrix molecule, including one or more of hyaluronic acid, collagen, heparin, laminin, gelatin, fibronectin, dextran, and/or chitosan. In some embodiments, the hydrogel may comprise any types of ECM derived short peptide sequences, including short peptides from collagen, laminin, gelatin, fibronectin, vitronectin, and so on.

In some embodiments, the 3D culture is a thin cell culture layer. In some embodiments, a thin layer is a layer having a width of at least 80 μm, at least 100 μm, at least 120 μm, at least 140 μm, at least 160 μm, at least 180 μm, at least 200 μm, at least 220 μm, at least 240 μm, at least 260 μm, at least 280 μm, at least 300 μm, at least 320 μm, at least 350 μm, at least 380 μm, at least 400 μm, or any value and range therebetween. Each possibility represents a separate embodiment. In some embodiments, a thin layer is 80-400 μm, 100-400 μm, 80-350 μm, 80-300 μm, 100-350 μm, 100-300 μm. Each possibility represents a separate embodiment of the invention.

In some embodiments, the 3D culture is a thick cell culture layer. In some embodiments, a thick layer is a layer having a width of at least 1 mm, at least 2 mm, at least 3 mm, at least 4 mm, at least 5 mm, at least 6 mm, at least 7 mm, at least 8 mm, at least 10 mm, or any value and range therebetween. Each possibility represents a separate embodiment. In some embodiments, a thick layer is 1-10 mm, 1-8 mm, 1-6 mm, 2-8 mm, 2-6 mm, 3-6 mm. Each possibility represents a separate embodiment.

As used herein, the term "cell population" refers to a group of at least two cells expressing or manifesting similar or different phenotypes. In some embodiments, a cell population comprises at least 10, at least 100, at least 200, at least 300, at least 400, at least 500, at least 600, at least 700, at least 800, at least 900, at least 1,000 cells expressing similar or different phenotypes, or any value and range therebetween. Each possibility represents a separate embodiment of the invention.

In some embodiments, the cell population is a heterogenous cell population. In some embodiments, a heterogeneous cell population is derived from subjecting cells to neuronal differentiation conditions as exemplified herein below.

As used herein, the term "heterogeneous cell population" refers to a group of at least two cells, wherein at least part of the cells express different phenotypes.

In some embodiments, at least 70%, at least 75%, at least 80%, at least 85%, at least 90%, at least 95%, at least 97%, at least 99%, or 100% of the cell population are genetically modified neurons, or any value and range therebetween. Each possibility represents a separate embodiment of the invention. According to some embodiments, 70-100%, 75-95%, 70-90%, 80-90%, or 90-100% of the cell population are genetically modified neurons. Each possibility represents a separate embodiment of the invention.

In some embodiments, the UBB+1 overexpressing neurons comprise neurons or neuronal tissue comprising FAD-related mutations, the ApoE4 allele, or both. In some embodiments, the UBB+1 overexpressing neurons are a result of progressed age, such as in the case of sporadic AD.

In some embodiments, the cell population comprises stem cells, neural stem cells, neural progenitor cells, neurons, or any combination thereof.

As used herein, the term "neural stem cells" or "NSCs" refers to self-renewing, multipotent cells that differentiate into the main phenotypes of the nervous system. NSCs include neurons, astrocytes, and oligodendrocytes.

As would be apparent to one of ordinary skill in the art, neural stem cell (NSCs) can be derived or isolated from developing fetuses, embryonic stem cells (ESCs), or induced pluripotent stem cells (iPSC).

The term "stem cell" is used herein to refer to a cell that have the ability both to self-renew and to generate a differentiated cell type (see Morrison et al. (1997) Cell 88:287-298). Stem cells may be characterized by both the presence of specific markers (e.g., proteins, RNAs, etc.) and the absence of specific markers. Stem cells may also be identified by functional assays both in vitro and in vivo, particularly assays relating to the ability of stem cells to give rise to multiple differentiated progeny.

The term "pluripotent stem cell" (PSC) refers to cells capable of differentiating or being differentiated by means known to one of ordinary skill in the art, into cells of any lineage. The term PSC refers to pluripotent stem cells regardless of their derivation. The term PSC encompasses the terms ESC and iPSC, as well as the term embryonic germ stem cells (EGSC), which are another example of a PSC. PSCs may be in the form of an established cell line, they may be obtained directly from primary embryonic tissue, or they may be derived from a somatic cell. PSCs can be target cells of the methods described herein.

The stem cells may be obtained from any mammalian species, e.g. human, equine, bovine, porcine, canine, feline, rodent, e.g. mice, rats, hamster, primate, etc. (Thomson et al. (1998) Science 282:1145; Thomson et al. (1995) Proc. Natl. Acad. Sci USA 92:7844; Thomson et al. (1996) Biol. Reprod. 55:254; Shamblott et al., Proc. Natl. Acad. Sci. USA 95:13726, 1998).

As used herein, the term "induced pluripotent stem cell (iPSC)" refers to a PSC that is derived from a cell that is not a PSC (i.e., from a cell this is differentiated relative to a PSC). iPSCs can be derived from multiple different cell types, including terminally differentiated cells. iPSCs have an ES cell-like morphology, growing as flat colonies with large nucleo-cytoplasmic ratios, defined borders and prominent nuclei. In addition, iPSCs express one or more key pluripotency markers known by one of ordinary skill in the art, including but not limited to Alkaline Phosphatase, SSEA3, SSEA4, Sox2, Oct3/4, Nanog, TRA160, TRA181, TDGF 1, Dnmt3b, FoxD3, GDF3, Cyp26al, TERT, and zfp42. Examples of methods of generating and characterizing iPSCs may be found in, for example, U.S. Patent Publication Nos. US20090047263, US20090068742, US20090191159, US20090227032, US20090246875, and US20090304646. Generally, to generate iPSCs, somatic cells are provided with reprogramming factors (e.g., Oct4, SOX2, KLF4, MYC, Nanog, Lin28, etc.) known in the art to reprogram the somatic cells to become pluripotent stem cells.

As used herein, the term "somatic cell" refers to any cell in an organism that, in the absence of experimental manipulation, does not ordinarily give rise to all types and/or lineages of cells in an organism. In other words, somatic cells are cells that have differentiated sufficiently that they will not naturally generate cells of all three germ layers of the body, i.e. ectoderm, mesoderm and endoderm. For example, somatic cells would include both neurons and neural progenitors, the latter of which may be able to naturally give rise to all or some cell types of the central nervous system but cannot give rise to cells of the mesoderm or endoderm lineages.

As apparent to one skilled in the art, the term "neural progenitor cells (NPCs)" refers to the progeny of stem cell division that normally undergoes a limited number of replication cycles in vivo. As apparent to one skilled in the art, "progenitor cells" differ from stem cells in that they typically do not have the extensive self-renewal capacity.

As used herein, the term "neural" refers to any structure of the nervous system, including neurons, glia, and more. As used herein, the terms "neuronal" or "neuron" refer to cells that express markers specific for cells of the neuronal lineage, e.g., Tau, Tuj1, MAP2, NeuN, and the like, and may have characteristics of functional neurons, that is, they may be able to be depolarized, i.e. propagate an action potential, and they may be able to make and maintain synapses with other neurons. A nerve cell or "neuron" typically comprises a cell body, an axon, axon terminals, and dendrites.

The term "differentiation" as used herein refers to the cellular development of a cell from a primitive stage to a mature formation that is associated with the expression of characteristic set of cell surface antigenic markers. Differentiation is a developmental process whereby cells assume a specialized phenotype, e.g., acquire one or more characteristics or functions distinct from other cell types. In some cases, the differentiated phenotype refers to a cell phenotype that is at the mature endpoint in some developmental pathway ("terminally differentiated cell").

In some embodiments, the cell culture comprises a cell culture medium. The term "cell culture medium" refers to any liquid medium which enables cells proliferation or differentiate. Growth media are known in the art and can be selected depending on the type of cell to be grown. For example, a growth medium for use in growing mammalian cells is Dulbecco's Modified Eagle Medium (DMEM) which can be supplemented with heat inactivated fetal bovine serum.

According some embodiments, the term "genetically modified cell" refers to a cell treated with one or more agents, in an amount effective and for a time sufficient (i.e., under conditions sufficient) to induce the expression of one or more genes in the cell. The gene expression of the genetically modified cells can then be determined, measured, confirmed, or validated using the methods known to one of skill in the art.

As used herein, the terms "conditions sufficient," or "under conditions sufficient," refer to the conditions for treating cells with one or more agents to provide gene expression in the cells compared to control, vehicle, or non-treated cells. Conditions include, but are not limited to the agents used to treat the cells and concentrations of agent(s), the time the cells are exposed to the agent(s), and the temperature of treatment.

As used herein, "agent" refers to a compound or molecule capable of inducing expression of one or more genes in a particular gene expression signature or plurality of genes.

In some embodiments, the genetically modified cell population comprises a recombinant cell. In one embodiment, a recombinant cell comprises exogenous polynucleotide. In another embodiment, a recombinant cell expresses an exogenous polynucleotide. In one embodiment, a recombinant cell constitutively expresses an endogenous polynucleotide. In another embodiment, a recombinant cell conditionally expresses an endogenous polynucleotide. A non-limiting example of constitutive expression is achieved by contacting a cell with an endogenous polynucleotide operably linked to a constantly operating promoter polynucleotide. In another embodiment, recombinant cell facultatively expresses endogenous or exogenous polynucleotide in response to a specific stimulation (e.g., induced or conditional expression). In another embodiment, recombinant cell expresses endogenous or exogenous polynucleotide indefinitely. Recombinant expressions systems are well known to one skilled in the art, non-limiting examples of which include the Tetracycline-controlled transcriptional activation ("Tet-on/Tet off"), Actin-GAL4-UAS, IPTG-inducible conditional expression, or others.

As used herein, the term "recombinant cell", refers to any cell whose genetic composition was artificially or synthetically modified.

In some embodiments, the agent is a polynucleotide sequence encoding a UBB+1 polypeptide. In some embodiments, an exogenous UBB+1 polypeptide can be generated in cells, tissues, or live animals, from endogenous human, mouse, or rat polynucleotide sequences (reflecting familial AD (FAD) models).

According to one embodiment, the neurons comprise an exogenous polynucleotide sequence encoding a UBB+1 sequence:

(SEQ ID NO: 1)
MQIFVKTLTGKTITLEVEPSDTIENVKAKIQDKEGIPPDQQRLIFAGKQ

LEDGRTLSDYNIQKESTLHLVLRLRGYASLREDPDRQDHHPGSGAQ.

In some embodiments, at least 5%, at least 10%, at least 20%, at least 30%, at least 40%, at least 50%, at least 60%, at least 70%, at least 80%, at least 90%, at least 95%, at least 99%, or 100%, of the genetically modified neurons express a UBB+1 polypeptide, or any value and range therebetween. Each possibility represents a separate embodiment of the invention. In some embodiments, 30-100%, 40-90%, 40-80%, 40-70%, 40-60%, 60-90%, 70-90%, 70-100%, 80-100%, or 90-100%, of the genetically modified neurons express a UBB+1 polypeptide. Each possibility represents a separate embodiment of the invention.

As used herein the term "exogenous" refers to a polynucleotide that does not naturally occur in a specified cell, e.g., a host cell. It is intended that the term encompass proteins that are encoded by naturally occurring genes, mutated genes, and/or synthetic genes and are introduced into the cell by molecular biological techniques. Examples of exogenous polynucleotides include vectors, plasmids, and/or man-made nucleic acid constructs encoding a desired protein.

The term "expression" as used herein refers to the biosynthesis of a gene product, including the transcription and/or translation of said gene product. Thus, expression of a nucleic acid molecule may refer to transcription of the nucleic acid fragment (e.g., transcription resulting in mRNA or other functional RNA) and/or translation of RNA into a precursor or mature protein (polypeptide).

Expressing of a gene within a cell is well known to one skilled in the art. It can be carried out by, among many methods, transfection, viral transduction, or direct alteration of the cell's genome. In some embodiments, the gene is in an expression vector such as plasmid or viral vector.

A vector nucleic acid sequence generally contains at least an origin of replication for propagation in a cell and optionally additional elements, such as a heterologous polynucleotide sequence, expression control element (e.g., a promoter, enhancer), selectable marker (e.g., antibiotic resistance), poly-Adenine sequence.

The vector may be a DNA plasmid delivered via non-viral methods or via viral methods. The viral vector may be a retroviral vector, a herpes viral vector, an adenoviral vector, an adeno-associated viral vector, a poxviral vector, or a lentiviral vector. The promoters may be active in mammalian cells. The promoters may be a viral promoter. The promoter may be a constitutive promoter or an inducible promoter.

In some embodiments, the exogenous polynucleotide is transduced into the cells by lentivirus. In some embodiments, the exogenous polynucleotide is stably integrated into the cell genome. In some embodiments, the exogenous polynucleotide is transiently expressed in the cells.

In some embodiments, transduced cells are cultured under effective conditions, which allow for the expression of high amounts of recombinant polypeptide. In some embodiments, effective culture conditions include, but are not limited to, effective media, bioreactor, temperature, pH and oxygen conditions that permit protein production. In one embodiment, an effective medium refers to any medium in which a cell is cultured to produce the recombinant polypeptide of the present invention. In some embodiments, a medium typically includes an aqueous solution having assimilable carbon, nitrogen and phosphate sources, and appropriate salts, minerals, metals and other nutrients, such as vitamins. In some embodiments, cells of the present invention can be cultured in conventional fermentation bioreactors, shake flasks, test tubes, microtiter dishes and petri plates. In some embodiments, culturing is carried out at a temperature, pH and oxygen content appropriate for a recombinant cell. In some embodiments, culturing conditions are within the expertise of one of ordinary skill in the art.

In some embodiments, the cell culture further comprises an amyloid plaque, a tau protein aggregation, or an amyloid plaque and a tau protein aggregation.

In some embodiments, the cell culture disclosed herein provides a significantly higher number of amyloid plaques and/or tau protein aggregations compared to a control (e.g., a 3D culture of neurons that are not genetically modified to express a UBB+1 polypeptide).

In some embodiments, "significantly higher" refers to an increase of at least 5%, at least 10%, at least 20%, at least 30%, at least 40%, at least 50%, at least 60%, at least 70%, at least 80%, at least 90%, at least 100%, at least 150%, at least 200%, at least 300%, or at least 400%, or any value or range therebetween. Each possibility represents a separate embodiment of the invention. In some embodiments, "significantly higher" refers to an increase of 5%-400%, 10%-400%, 20%-400%, 30-300%, 50-250%, 40-200%, 40-100%. Each possibility represents a separate embodiment of the invention.

In one embodiment, the invention comprises a method for determining the efficacy of a test substance on a neurodegenerative disease. In some embodiments, the method comprises contacting the 3D culture of the invention with an effective amount of a test substance and determining in the 3D culture a responsive change in at least one characteristic of a neurodegenerative disease, thereby determining the test substance efficacy on the neurodegenerative disease.

In some embodiments, a neurodegenerative disease is selected from Alzheimer's disease, Parkinson's disease, and Huntington's disease.

In some embodiments, the neurodegenerative disease is Alzheimer's disease.

As used herein, the term "Alzheimer's disease" or "AD" encompasses both, sporadic Alzheimer's disease (SAD) and the genetic or familial forms of Alzheimer's disease (FAD).

In some embodiments, characteristics of a neurodegenerative disease are selected from: progressive loss of structure and/or function of neurons. In some embodiments, characteristics of a neurodegenerative disease are selected from: axonal swelling, axonal segment breaks, beta-amyloid accumulation (Aβ plaques), C99 fragment accumulation, tau protein aggregation, neuronal apoptosis, F-Actin bundles formation, and any combinations thereof. In some embodiments, the characteristic is selected from: Aβ plaques, tau protein aggregation, cell death, and any combination thereof.

In some embodiments, at least one characteristic of a neurodegenerative disease is mimicked in a cell, cell population, or cell culture by the sole expression of a polynucleotide encoding a UBB+1 polypeptide in a cell.

As used herein, the term "contacting" encompasses depositing, applying, administering, providing, touching, and the like, which are used herein interchangeably.

In some embodiments, contacting the 3D culture with the test substance is preformed prior to cell differentiation, during cell differentiation, or after cell differentiation. In some embodiments, contacting the 3D culture with the test substance is prior to the appearance of neurodegenerative disease characteristics in the 3D culture. In some embodiments, contacting the 3D culture with the test substance is after the appearance of neurodegenerative disease characteristics in the 3D culture. Each possibility represents a separate embodiment.

In some embodiments, term "test substance" refers to a material that is expected to provide a responsive change in a 3D culture of the invention.

According to some embodiments, "an effective amount" refers to an amount of a test substance that provides the responsive change.

In some embodiments, a responsive change refers to reduction, inhibition, suppression, or prevention of a characteristic of a neurodegenerative disease compared to a control (e.g., a 3D culture that was not contacted with the test substance). In some embodiments, a responsive change refers to an improvement to the wellbeing of cells in the culture disclosed compared to a control (e.g., a 3D culture that was not contacted with the test substance).

A variety of known techniques may be suitable for determining the efficacy of a test substance on a neurodegenerative disease. Physical characteristics of the cells can be analyzed by observing cell and neurite morphology and growth with microscopy. The induction of expression of new or increased levels of proteins such as enzymes, receptors and other cell surface molecules, or of neurotransmitters, amino acids, neuropeptides, or protein aggregates can be analyzed with any technique known in the art which can identify the expression level of such molecules. These techniques include immunohistochemistry using antibodies against such molecules, or biochemical analysis. Such biochemical analysis includes protein assays, enzymatic assays, receptor binding assays, enzyme-linked immunosorbent assays (ELISA), electrophoretic analysis, analysis with high performance liquid chromatography (HPLC), Western blots, and radioimmune assays (RIA). Nucleic acid analysis such as Northern blots and PCR can be used to examine the levels of mRNA coding for these molecules, or for enzymes which synthesize these molecules.

In one embodiment, there is provided a process of making the 3D culture of the invention. In some embodiments, the process comprises:
a. growing neural stem cells or neural progenitor cells,
b. transducing an exogenous gene encoding SEQ ID NO:1 to the cells, and
c. cultivating the cells to a cell population organized in a 3D culture.

In some embodiments, transducing an exogenous gene to the cells is preformed prior to cultivating the cells to a cell population organized in a 3D culture. In some embodiments, transducing an exogenous gene to the cells is preformed after cultivating the cells to a cell population organized in a 3D culture. In some embodiments, transducing an exogenous gene to the cells preformed prior to cell differentiation, during cell differentiation, or after cell differentiation.

The term "cultivation" refers to the maintenance of cells in an artificial environment under conditions favoring growth, differentiation, biologic production or continued viability, in an active or quiescent state, of the cells. Thus, "cultivation" may be used interchangeably with "cell culture" or any of its synonyms described above.

In some embodiments, the process further comprises sorting the cells population for cells transduced with the exogenous gene. Any method of cell sorting may be employed, such as, for example, magnetic cell sorting techniques, or flow cytometry fluorescence-based cell sorting.

In some embodiments, cultivating the cells to a three-dimensional culture is for a duration of at least 3 weeks, at least 4 weeks, at least 5 weeks, at least 6 weeks, at least 7 weeks, at least 8 weeks, at least 9 weeks, at least 10 weeks, or at least 12 weeks, or any value and range therebetween. Each possibility represents a separate embodiment of the invention. In some embodiments, cultivating the cells to a three-dimensional culture is for 1-12 weeks, 1-10 weeks, 1-8 weeks, 2-10 weeks, 2-8 weeks, 3-10 weeks, or 3-8 weeks. Each possibility represents a separate embodiment of the invention.

In one embodiment, there is provided a kit comprising the components for producing the in-vitro system of the invention.

In some embodiments, the kit comprises instruction for use.

In some embodiments, the kit is packaged within a container. In some embodiments, some or all components of the kit may be packaged in suitable packaging to maintain sterility.

In some embodiments, the kit contains instructions for preparing the 3D culture used therein and for how to practice the methods of the invention. In some embodiments, the instructions may be present in the kit as a package insert, in the labelling of the container of the kit or components thereof (i.e., associated with the packaging or sub-packaging) etc. In other embodiments, the instructions are present as an electronic storage data file present on a suitable computer readable storage medium, e.g. CD-ROM, diskette, etc. In other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

According to some embodiments, there is provided a synthetic RNA interfering (RNAi) oligonucleotide comprising or consisting of 21 to 25 contiguous nucleotides comprising the nucleic acid sequence GGTATGCTAGCCTTCGTGAAG (SEQ ID NO: 7).

In some embodiments, the RNAi oligonucleotide comprises or consists of 21, 22, 23, 24, or 25 contiguous nucleotides comprising the nucleic acid sequence GGTATGCTAGCCTTCGTGAAG (SEQ ID NO: 7), or any value and range therebetween. Each possibility represents a separate embodiment of the invention.

In some embodiments, the RNAi oligonucleotide consisting of SEQ ID NO: 7.

In some embodiments, the RNAi oligonucleotide is chemically modified. In some embodiments, the chemical modification is a modification of a backbone of the RNAi oligonucleotide. In some embodiments, the chemical modification is a modification of a sugar of the RNAi oligonucleotide. In some embodiments, the chemical modification is a modification of a nucleobase of the ASO. In some embodiments, the chemical modification increases stability of the RNAi oligonucleotide in a cell. In some embodiments, the chemical modification increases stability of the RNAi oligonucleotide in vivo. In some embodiments, the chemical modification increases the RNAi oligonucleotide's ability to modulate splicing. In some embodiments, the chemical modification increases the ASO's ability to induce silencing and/or degradation of an mRNA molecule encoding being translated to UBB+1 protein. In some embodiments, the chemical modification increases the half-life of the RNAi oligonucleotide. In some embodiments, the chemical modification inhibits polymerase extension from the 3' end of the RNAi oligonucleotide. In some embodiments, the chemical modification inhibits recognition of the RNAi oligonucleotide by a polymerase. In some embodiments, the chemical modification inhibits double-strand trigged degradation.

In some embodiments, the RNAi oligonucleotide is devoid of a labeling moiety. In some embodiments, the RNAi oligonucleotide is not labeled. In some embodiments, the RNAi oligonucleotide does not emit a detectable signal or does not comprise moieties capable of being recognized so as to enable nucleic acid detection (e.g., digoxigenin and fluorescently labeled anti-DIG antibody). In some embodiments, a detectable signal comprises a dye or an emitting energy which provides detection of a compound, e.g., a polynucleotide, in vivo or in vitro. In some embodiments, a detectable signal comprises: a fluorescent signal, a chromatic signal, or a radioactive signal.

In some embodiments, the RNAi oligonucleotide is devoid of radioactive nucleobase(s); digoxigenin, streptavidin, biotin, a fluorophore, hapten label, CLICK label, amine label, or thiol label.

In some embodiments, the chemically modified backbone comprises: a phosphate-ribose backbone, a phosphate-deoxyribose backbone, a phosphorothioate-deoxyribose backbone, a 2'-O-methyl-phosphorothioate backbone, a phosphorodiamidate morpholino backbone, a peptide nucleic acid backbone, a 2-methoxyethyl phosphorothioate backbone, an alternating locked nucleic acid backbone, a phosphorothioate backbone, N3'-P5' phosphoroamidates, 2'-deoxy-2'-fluoro-β-d-arabino nucleic acid, cyclohexene nucleic acid backbone nucleic acid, tricyclo-DNA (tcDNA) nucleic acid backbone, and a combination thereof.

In some embodiments, the RNAi oligonucleotide is a synthetic oligonucleotide.

According to some embodiments, there is provided a pharmaceutical composition comprising the RNAi oligonucleotide of the invention, and an acceptable carrier.

In some embodiments, the composition comprises a modified Lamp2b protein. In some embodiments, the composition comprises a viral glycoprotein (RVG) peptide. In some embodiments, a viral glycoprotein (RVG) peptide comprises the amino acid sequence:

```
                                              (SEQ ID NO: 8)
YITWMPENPRPGTPCDIFTNSRGKRASNG.
```

In some embodiments, the composition comprises a chimeric polypeptide comprising Lamp2b protein and RVG. In some embodiments, the Lampb2 and RVG are directly linked to one another. In some embodiments, the chimeric polypeptide comprises a linker spacing between the Lampb2 protein and RVG. In some embodiments, the linker is a flexible linker. In some embodiments, the linker is a peptide linker. In some embodiments, the peptide linker comprises at least 2 amino acids. In some embodiments, the peptide linker comprises 2-20 amino acids, 3 to 30 amino acids, or 1 to 15 amino acids.

Lampb2 protein is disclosed in Alvarez-Erviti et al., 2011 (*Nature Biotech*; Kumar et al., 2007 *Nature*).

In some embodiments, the composition is in the form of an exosome. In some embodiments, the composition comprises at least one exosome comprising the RNAi oligonucleotide of the invention. In some embodiments, the exosome comprises Lampb2 protein. In some embodiments, the exosome comprises RVG peptide. In some embodiments, the exosome comprises the chimeric polypeptide disclosed herein.

The term "pharmaceutically acceptable carrier" as used herein refers to any of the standard pharmaceutical carriers known in the field such as sterile solutions, tablets, coated tablets, and capsules. Typically, such carriers contain excipients such as starch, milk, sugar, certain types of clay, gelatin, stearic acids or salts thereof, magnesium or calcium stearate, talc, vegetable fats or oils, gums, glycols, or other known excipients. Such carriers may also include flavor and color additives or other ingredients. Examples of pharmaceutically acceptable carriers include, but are not limited to, the following: water, saline, buffers, inert, nontoxic solids (e.g., mannitol, talc). Compositions comprising such carriers are formulated by well-known conventional methods. Depending on the intended mode of administration and the intended use, the compositions may be in the form of solid, semisolid, or liquid dosage forms, such, for example, as powders, granules, crystals, liquids, suspensions, liposomes, nanoparticles, nano-emulsions, pastes, creams, salves, etc., and may be in unit-dosage forms suitable for administration of relatively precise dosages.

In some embodiments, the pharmaceutical composition is formulated for intravenous administration. In some embodiments, the pharmaceutical composition is formulated for intra-spinal administration. In some embodiments, the pharmaceutical composition is formulated for administration to the nervous system by any means known to one of ordinary skill in the art. In some embodiments, the pharmaceutical composition is formulated such that the RNAi oligonucleotide disclosed herein is delivered across the blood-brain-barrier (BBB). Methods and formulations so as to deliver a compound, e.g., an RNAi oligonucleotide as disclosed herein, across the BBB are common and would be apparent to one of ordinary skill in the art.

In some embodiments, the pharmaceutical composition is formulated for systemic administration. In some embodiments, the pharmaceutical composition is formulated for administration to a subject. In some embodiments, the subject is a human subject. It will be understood by a skilled artisan that a pharmaceutical composition intended to administration to a subject should not have off-target effects, i.e. effects other than the intended therapeutic ones. In some embodiments, the pharmaceutical composition is devoid of a substantial effect on a gene other than UBB+1. In some embodiments, the pharmaceutical composition is devoid of a substantial effect on silencing any mRNA molecule other than the mRNA molecule encoding UBB+1. In some embodiments, a substantial effect is one with a phenotypic result. In some embodiments, a substantial effect is a deleterious effect. In some embodiments, deleterious is with respect to the health and/or wellbeing of the subject.

Being a long-known and well-studied disease, certain drugs and agents are known in the art for the treatment of Alzheimer's disease patients. Administrating a synthetic polynucleotide molecule according to the present invention with one or more of these drugs may be beneficial in achieving significant therapeutic results.

In some embodiments, the pharmaceutical composition comprises the RNAi oligonucleotide of the invention. In some embodiments, the composition comprises at the RNAi oligonucleotide in an amount of at least 1 nM, at least 2.5 nM, at least 10 nM, or any value and range therebetween. Each possibility represents a separate embodiment of the invention. In some embodiments, the composition comprises at the RNAi oligonucleotide in an amount of 2.5 nM to 10 nM, 1 nM to 100 nM, 1 nM to 0.5 µM, or 1 nM to 1 µM. Each possibility represents a separate embodiment of the invention.

In some embodiments, an RNAi oligonucleotide as disclosed and as described hereinabove, or a pharmaceutical composition comprising thereof, is used in the modulation of expression of a UBB+1 protein translated from a UBB+1 mRNA.

The phrase "modulation of expression" as used herein refers to reduction or inhibition of the level of UBB+1 polypeptide translated from UBB+1 mRNA. For example, modulation may mean e.g., silencing of the UBB+1 mRNA, inhibiting translation of the UBB+1 mRNA, reducing the stability of the UBB+1 mRNA, degrading the UBB+1 mRNA, preventing or reducing the association of UBB+1 mRNA and a ribosome, or any combination thereof.

In certain embodiments, the use is for reducing the level of a UBB+1 mRNA molecule. In some embodiments, the use is for reducing the level of an mRNA molecule encoding a polypeptide sequence set forth in SEQ ID NO: 1.

In some embodiments, an RNAi oligonucleotide as disclosed and as described hereinabove, or a pharmaceutical composition comprising thereof, is used in method for improving at least one clinical parameter of AD. In some embodiments, an RNAi oligonucleotide as disclosed and as described hereinabove, or a pharmaceutical composition comprising thereof, is used in the treatment of AD.

In some embodiments, the RNAi oligonucleotide as described herein comprises any one of: antisense oligonucleotide, ribozyme, external guide sequence (EGS) oligonucleotide, siRNA compound, single- or double-stranded RNA interference (RNAi) compound such as siRNA compound, modified bases/locked nucleic acid (LNA), antagomir, peptide nucleic acid (PNAs), or any other oligomeric compound or oligonucleotide mimetic capable of hybridizing to at least a portion of the target nucleic acid, such as a gene or a transcript thereof, and modulate its function. In some embodiments, the antisense sequence comprises an antisense RNA, antisense DNA, chimeric antisense oligonucleotide, antisense oligonucleotide comprising modified linkages, micro interfering RNA (miRNA), and a short hairpin RNA (shRNA).

As used herein, the term "interfering RNA" refers to any double stranded or single stranded RNA sequence, capable—either directly or indirectly (i.e., upon conversion)—of inhibiting or down regulating gene expression by mediating RNA interference. Interfering RNA includes but is not limited to siRNA and shRNA. RNAi refers to the selective degradation of a sequence-compatible messenger RNA transcript.

As used herein, the term "shRNA" refers to an RNA molecule comprising an antisense region, a loop portion, and a sense region, wherein the sense region has complementary nucleotides that base pair with the antisense region to form a duplex stem. Following post-transcriptional processing, the small hairpin RNA is converted into a small interfering RNA by a cleavage event mediated by the enzyme Dicer, which is a member of the RNase III family.

As used herein, the term siRNA refers to any small RNA molecule capable of inhibiting or down regulating gene expression by mediating RNA interference in a sequence specific manner. The small RNA can be, for example, about 18 to 21 nucleotides long.

As used herein, the term dsRNA refers to any double stranded RNA molecule capable of inhibiting or down regulating gene expression by mediating RNA interference in a sequence specific manner. The dsRNA can be, for example, about 50 to 1,000 nucleotides long, about 50 to 500 nucleotides long, about 150 to 750 nucleotides long, or about 100 to 500 nucleotides long, or any value and range therebetween. Each possibility represents a separate embodiment of the invention.

According to some embodiments, there is provided a method for treating a subject afflicted with AD, the method comprising administering to the subject a therapeutically effective amount of any one of: (a) the RNAi oligonucleotide of the invention; or (b) the pharmaceutical composition comprising same, thereby treating the subject afflicted with AD.

In some embodiments, administering comprises intravenously administering, intra-spinally administering, or a combination thereof.

As used herein the term "in vitro" refers to any process that occurs outside a living organism.

As used herein, the term "about" when combined with a value refers to plus and minus 10% of the reference value. For example, a length of about 1,000 nanometers (nm) refers to a length of 1,000±100 nm.

It is noted that as used herein and in the appended claims, the singular forms "a," "an," and "the" include plural referents unless the context clearly dictates otherwise. Thus, for example, reference to "a polynucleotide" includes a plurality of such polynucleotides and reference to "the polypeptide" includes reference to one or more polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Various embodiments and aspects of the present invention as delineated hereinabove and as claimed in the claims section below find experimental support in the following examples.

EXAMPLES

Generally, the nomenclature used herein, and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Strategies for Protein Purification and Characterization—A Laboratory Course Manual" CSHL Press (1996); all of which are incorporated by reference. Other general references are provided throughout this document.

Materials and Methods

Cell Lines and Media

HEK293FT cells were purchased from ATTC (Manassas, VA) and maintained in Dulbecco's Modified Eagle Medium-DMEM (Biological Industries) supplemented with 10% FBS (Biological Industries) L-glutamine, sodium pyruvate, sodium bicarbonate and penicillin/streptomycin (Biological Industries; 1:100). For transfection, cells were plates onto poly-L-lysine (Sigma-Aldrich, 0.02 mg/ml in PBS) and transfected using polyethyleneimine, branched (MERK) in serum free medium.

ReNcell VM human neural progenitor cell line (ReN) were purchased from EMD Millipore (Billerica, MA, USA) and maintained in DMEM/F12 (Biological Industries) medium supplemented with 2 µg ml-1 heparin (StemCell Technologies, Vancouver, Canada), 2% (v/v) B27 neural supplement (LIFE TECHNOLOGIES®, Grand Island, NY, USA), 20ngml-1 EGF (PEPROTECH®), 20ngml-1 bFGF PEPROTECH®) and 1% (v/v) penicillin/streptomycin/amphotericin-b solution (Biological Industries) (proliferation medium).

For 3D neuronal/glial differentiation, cells in Matrigel were plated on either 24-well glass-bottom plates (Greiner-bio-one), 35 mm glass-bottom plates (ibidi) or cell culture inserts, 0.4 µm pore size (Greiner-bio-one) and companion plates, 24 well, for cell culture inserts (GREINER-BIO-ONE®). The cells were differentiated with Dulbecco's Modified Eagle's Medium (DMEM) and Ham's F-12 Nutrient Mixture (DMEM/F12 media) supplemented with 2 µg/ml heparin, 2% (v/v) B27 neural supplement, and 1% (v/v) penicillin/streptomycin/amphotericin-b solution without growth factors. Half of the volume of differentiation medium was replaced every 4 days for the duration of 3-8 weeks.

DNA Constructs and Viral Packaging

Lentiviral polycistronic CSCW vectors included CSCW-GFP, CSCW-mCherry and CSCW-APP-IRES-PSEN1 (ΔE9)-IRES-mCherry, encoding full-length human β-amyloid precursor protein (APP695) with the V717I and K670N/M671L mutations and the human presenilin 1 (PSEN1 (ΔE9)). UBB+1 was cloned into CSCW-GFP or CSCW-mCherry backbones using XhoI and BstbI.

To generate lentiviral vectors for RNA silencing, the inventors restricted LV-GFP lentiviral vector (ADDGENE plasmid #25999) with RsrII and EcoRI enzymes. shRNA oligos were annealed and cloned into LV-GFP cleaved vector. Sequences are as follows:

UBB$^{+1}$ forward sequence:
(SEQ ID NO: 2)
5'CGCGGGTATGCTAGCCTTCGTGAAGCTCGAGCTTCACGAAGGCTAGC

ATACCTTTTTG3';

Reverse sequence:
(SEQ ID NO: 3)
5'AATTCAAAAAGGTATGCTAGCCTTCGTGAAGCTCGAGCTTCACGAAG

GCTAGCATACC3';

Scrambled control forward sequence:
(SEQ ID NO: 4)
5'GTCACAGAGAGATAGCGCGTGTGTCTCGAGACACACGCGCTATCTCT CTGTTTTTTG3';;
and Reverse sequence:
(SEQ ID NO: 5)
5'AATTCAAAAAACAGAGAGATAGCGCGTGTGTCTCGAGACACACGCGC

TATCTCTCTGT3'.

Figures 11A, 11B:
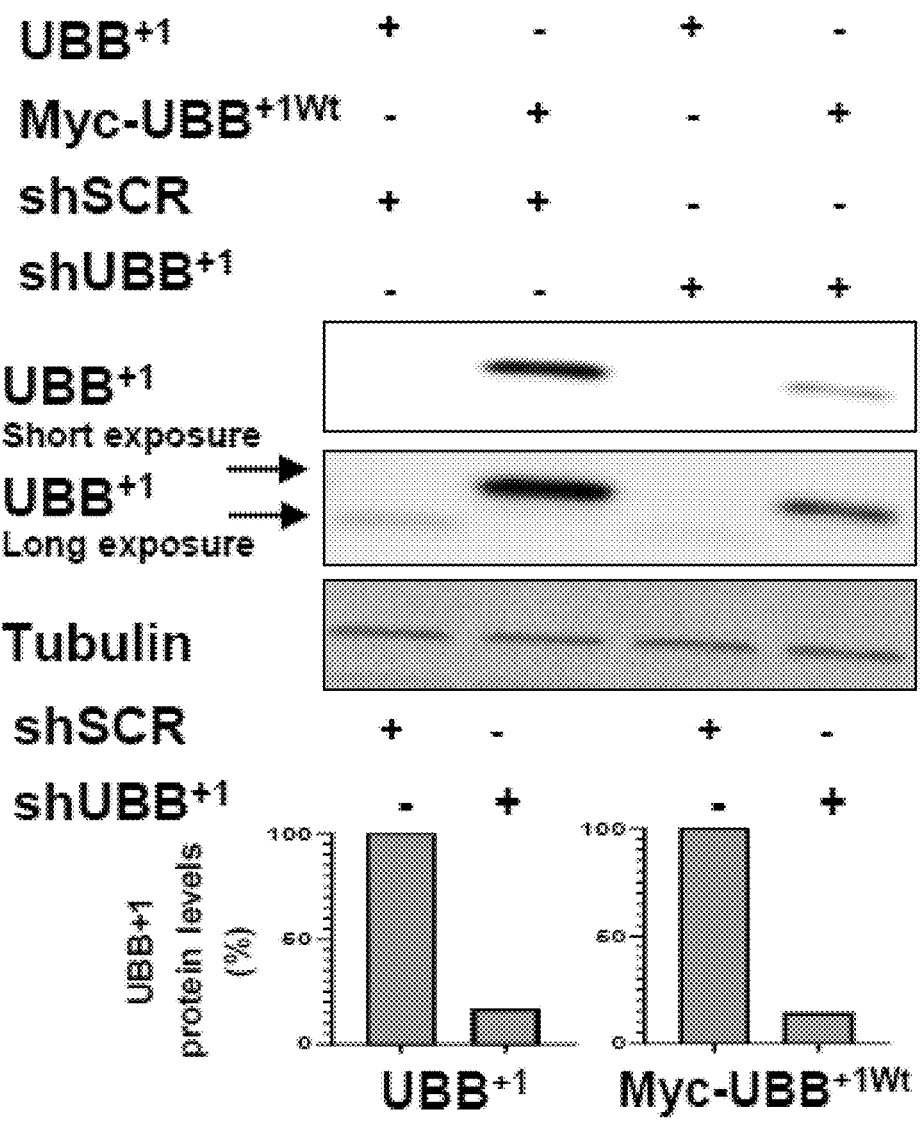

For the design of shRNA/miRNA see details in FIG. 11A.

Plasmids were transfected into HEK293FT cells and lentiviral particles were collected and concentrated using centricons, for lentiviral infection of ReN VM cells using polybrene (hexadimethrine bromide, Sigma, 0.1 mg/ml). For recombinant expression and purification of His tagged proteins, HIS-Thrombin-UBB+1/ubiquitin were inserted in pQE30 using BamHI and SalI (M1726 and M1725, respectively).

FACS Enrichment of the Transduced Cells

Briefly, infected ReN cells were washed with PBS and incubated with Accutase (Millipore) for 5 min. The cell pellets were resuspended in PBS supplemented with 2% serum replacement solution and 2% B27 (LIFE TECHNOLOGIES®), and then passed through a cell strainer filter (40 µm Nylon, BD BIOSCIENCES®). Cell concentrations were adjusted to $3 \times 10^6$ cells per ml and sorted using the FACSAriaIIIu cell sorter. Dead cells, debris and doublets were gated out according to FSC and SSC properties. Sorting gates were set to select cells with high expression (top 2%) of both GFP and mCherry. After sorting, cells were seeded immediately and maintained in normal proliferation media.

3D Cell Cultures and Differentiation 3D cultures were produced and maintained as described. Briefly, for thin-layer 3D cultures, Matrigel stock solution was diluted with ice-cold differentiation medium (1:11 dilution ratio) and then vortexed with the cell pellets. The final cell concentration for the mixture was approximately $1\times10^7$ cells per ml. Plates were incubated for 24 hours at 37° C. to form a thin-layer 3D gels and the media was added the next day. 3D-plated cultures were differentiated for 3-8 weeks, and medium was replaced every 4 days. For thick-layer 3D cultures, Matrigel solution was diluted with the same volume of ice-cold differentiation medium (1:2 dilution ratio) and vortexed with ReN cell pellets for 20 seconds. The final cell concentration for the mixture was $1\times10^7$ cells per ml. After 24 hours incubation at 37° C. differentiation medium was added, and the cultures were maintained for 3-8 weeks.

Immunofluorescence Staining

For SK-N-SH cells, samples were fixed with 4% PFA at RT for 20 min. Fixed cells were then permeabilized with 0.1% Triton X-100 and blocked in 10% BSA at RT for 1 h. Washing was performed with TBS buffer containing 0.2% (v/v) Tween-20 (TBST). Cells were incubated with primary antibodies in 2% BSA at 4° C. O/N with gentle rocking. After washing three times with TBST, the cells were then incubated with ALEXA FLUOR® secondary antibodies for 1 h at RT. After washing three times with TBST, flouromountG (THERMO FISHER SCIENTIFIC®) was added to the samples. Immunofluorescence staining for 3D-cultured ReN cells were performed as in Kim et al., 2015, utilizing the following antibodies: 6E10 anti-amyloid-β antibody (1:100, BIOLEGEND, Cat. no. 803015); 3D6 anti-amyloid-β antibody (1:400, CREATIVE BIOLABS, Cat. no. PABL-011), anti-GFAP antibody (1:2,000, DAKO, Cat. no. Z0334); anti-tyrosine hydroxylase (1:100, CELL SIGNALING TECHNOLOGY®, Cat. no. 2792); anti-NR2B (1:100, ANTIBODIES INCORPORATED, Cat. no. N/59/36). ALEXA FLUOR® 488/546 anti-mouse, and -rabbit secondary antibodies (1:400, LIFE TECHNOLOGIES®, Cat. no. A-11011, A-11003, A-11034, A-11035). For UBB+1 staining; thin-layer 3D cultures were fixed with 4% PFA at room temperature for 24 h. The fixed cells were then permeabilized with TBS buffer containing 0.1% (v/v) Tween-20 (TBST) including 0.1% TRITON X-100®X-100 at RT for 1 h. Next, samples were blocked by incubating with a blocking solution containing 5% goat serum, 1% BSA, 2% gelatin and 0.3% triton 100× in PBS at RT for 5 h. After washing briefly with TBST, the 3D cultures were incubated with anti UBB+1 (custom made by SIGMA-ALDRICH® for our lab using the c-terminus 19aa sequence 4) in blocking solution at RT O/N. After washing five times with TBST for 10 mins, the cells were then incubated with ALEXA FLUOR®secondary antibodies for 5 h at RT and washed with TBST for at least two hours at RT. Large plaques were defined as ≥100 μm. For ApoE-TR mice, immunostaining was performed as previously described 27, utilizing the following antibodies: anti UBB[+1] (1:500, custom-made by SIGMA-ALDRICH® for our lab using the c-terminus 19aa sequence 4), anti-GFAP antibody (1:200, SANTA CRUZ BIOTECHNOLOGY, Cat. no. sc-33673); and anti MAP2 (1:1,000, ABCAM, Cat. no ab5392). Fluorescence images were captured by a ZEISS LSM880 confocal microscope.

Thioflavin S Staining

Thioflavin S staining protocol was used for staining thin 3D cultures. Samples were fixed, permeabilized and blocked as described for immunofluorescence. Next, cultures were incubated with 0.02% Thioflavin S (SIGMA-ALDRICH®) in 50% ethanol for 10 min at room temperature. After briefly rinsing with distilled water three times, samples were washed several times in 50% and 70% Ethanol for at least two hours until the background was cleared. Samples were then washed twice with DDW and fluoromountG was added.

Immunohistochemistry Staining

For immunohistochemistry (IHC), thin-layer 3D of 100-300 μm cultures were permeabilized and blocked by incubating with blocking solution at 4° C. for 12 hours. To block endogenous peroxidase activities, the cultures were incubated with 0.3% (v/v) $H_2O_2$ solution in TBS for 5 min at room temperature, washed with TBST five times and incubated with the blocking solution for 12 hours at 4° C. After incubating with the primary antibody solutions for 24 hours at 4° C., the cultures were washed five times with TBST and then incubated with IMMPRESS anti-mouse Ig IMMPRESS Peroxidase Polymer Detection Kit, Vector Laboratories, Burlingame, CA, USA) for 30 min. The cultures were washed five times for 10 min each with TBST and developed by using IMMPACT DAB Peroxidase Substrate kit (VECTOR LABORATORIES). The following antibodies and dilution rates were used: AT8 anti-p-tau antibody (1:30, THERMO FISHER SCIENTIFIC®, Cat. no. MN1020); 6E10 anti-amyloid-β antibody (1:100, BIOLEGEND, Cat. no. 803015).

Differential Extraction of Thick 3D Cultures

Six weeks-old thick-layer 3D cultures were collected, saved at −80° C. until analysis and extracted as described. Briefly, samples were thawed on ice and homogenized with TBS extraction buffer, sonicated in a sonication bath for 10 min and centrifuged for 1 hour at 100,000 g to obtain TBS-soluble fractions. The TBS-insoluble pellets were then resuspended in 2% SDS extraction buffer, sonicated for 10 min and centrifuged for 1 hour at 100,000 g. The supernatant fractions were collected as SDS-soluble fractions. The 2% SDS-insoluble pellets were briefly washed with SDS extraction buffer and then further extracted with 70% formic acid (SIGMA-ALDRICH®) on ice and centrifuged for 1 h at 100,000 g to produce formic-acid-soluble fractions. The formic acid fractions were enriched by using SpeedVac and neutralized by 2 M Tris-HCl buffer (pH 8.3). β-tubulin levels of SDS-soluble fractions were used to normalize the total protein levels in SDS and formic acid fractions.

Transmission Electron Microscopy (TEM) and Cryo-TEM

Cryogenic transmission electron microscopy (cryo-TEM) and room-temperature TEM for negative staining were both performed by a FEI T12 G2 electron microscope, operated at 120 kV. Images were recorded digitally by a Gatan US 1000 CCD camera (TECNAI® T12 G2), using the Digital-Micrograph® software. Immunogold staining: Immunogold staining of sarkosyl-insoluble samples for TEM analysis was performed as previously described17 with minor changes as following: sarkosyl-insoluble fractions were resuspended in 100 μl of PBS. Samples were incubated with primary antibody (mouse anti-tau46, 1:25) for 1 h at RT, next, secondary antibody was added (goat anti-mouse IgG 10 nm gold, 1:15) and incubated for 1 h. Negative staining specimen preparation for TEM: Negatively stained specimens were prepared on 200-mesh copper grids coated with carbon type-B continuous film. Prior to specimen preparation, the grids were plasma etched in a PELCO EASIGLOW glow-discharger (TED PELLA INC., Redding, CA) to increase their hydrophilicity and clean their surface. A grid was placed on the surface of a 15-μl drop of sample for two minutes, with the coated side facing the drop. The grid was then placed on a 15-μl drop of 2% Uranyl Acetate stain for a two-minute incubation.

Cryo-TEM specimen preparation: Cryo-TEM specimens were prepared in a 25° C. temperature-controlled chamber with humidity at saturation vitrification system. A drop of the solution was placed on a carbon-coated perforated polymer film, supported on a 200 mesh TEM grid, mounted on a tweezers. The drop was turned into a thin film and grid was then plunged quickly into liquid ethane at its freezing point (−183° C.). Prior to specimen preparation, grids were plasma etched in a PELCO EASIGLOW glow-discharger (TED PELLA INC., Redding, CA) to increase hydrophilicity. Following preparation, specimens were transferred under cryogenic conditions into a Gatan 626.6 cryo-holder and equilibrated below −170° C. for imaging in the TEM.

Immunoprecipitation and Affinity Purification

To test for binding partners of UBB+1 or UCH-L1, co-immunoprecipitation was performed in HEK293FT cells. Cells were transfected with UBB+1 expression vector and lysed after 24 h. Cells were resuspended in an equal volume of lysis buffer (20 mM HEPES, pH 7.4, 150 mM NaCl, 10% glycerol, 1% TRITON X-100®, 1 mM EGTA) containing protease inhibitors (ROCHE®). Lysate were collected into a fresh, ice-cold tube and incubated on ice for 30 minutes and centrifuged at 11,000×g, at 4° C. for 10 min. 15 µl of each lysate was put aside for total protein determination. To identify UCH-L1-binding partners, lysates were incubated with either anti UCH-L1 antibodies (ABCAM, Cat. no. ab8189) or anti-UBB+1 antibodies (custom-made by SIGMA-ALDRICH® using the c-terminus 19 aa sequence 4), O/N with slow rotation at 4° C. The next day 40 µl A/G beads were added to each lysate and incubated for at least 2 hours with slow rotation at 4° C. Beads were washed 4 times with 1 ml lysis buffer and finally 40 µl of Protein Sample Buffer concentrated×2 was added to the beads and heated at 95° C. for 10 min. To identify APP ubiquitination, immunoprecipitation of APP c-terminus was performed as described previously 21, utilizing anti c-terminus APP antibody (MERK, Cat. no. 751-770) and A/G beads, elution fraction was resolved by SDS-PAGE and immunoblotted with anti-ubiquitin antibody (DAKO, Cat. no. Z0458). Pulldown by affinity co-purification of recombinant proteins was performed by incubation of 50 µg GST-UCH-L1 with 50 µg 6×His-UBB+1/Ubiquitin in 500 µl TBS for 2 hours at 25° C. and purified over Ni-NTA (ABT) according to manufacturer's protocols. A reciprocal experiment was performed incubating 50 µg 6×His-UBB+1/Ubiquitin in 500 µl TBS with immobilized GST-UCH-L1 on GSH-sepharose (ABT) and eluting according to manufacturer's protocol.

Affinity purification of STREP-UCH-L1 was performed according to purification protocol (STREP-TACTIN® XT Spin Column, iba SOLUTIONS FOR LIFE SCIENCES).

Extraction of Amyloid-β from Medium

HEK293FT cells were transfected with the relevant vectors in serum free medium. 24 hours after transfection, medium was collected and methanol precipitation was performed as follows: Four volumes of 100% ice-cold methanol were added to each sample, vortexed and incubated at −80° C. O/N. The next day, samples were centrifuged at 4,000 g, 4° C., 10 min and supernatant was removed carefully. Samples were washed twice with 70% ice-cold methanol and pellet was air-dried for approximately 20 min. Pellets were resuspended in protein loading dye×1 and run on a 16% tris-tricine gel.

Ligase Assay

Ligase assay was performed according to Liu et al. 2002 (Cell). Specifically, the inventors purified recombinant GST-UCHL1, His6-ubiquitin, and His6-UBB+1. Ligation of Ub-AMC was performed by mixing UCH-L1 (1 µM): Ub-AMC (3 µM; Boston Biochem) at 1:3 in reaction buffer containing 50 mM Tris pH 7.4 and 5 mM DTT at 37° C. for three hours with slow rotation. Reaction was repeated with addition of 50-fold of either Ubiquitin (50 µM) or UBB+1 (50 µM). Loading buffer was added to the samples, and samples were loaded to 16% tris-tricine gel and transferred to nitrocellulose membrane for immunoblotting against Ubiquitin. Before incubation, 15 µl of each sample were taken for analysis of hydrolysis of the AMC conjugate by measuring the fluorescence of released AMC by spectrophotometer (CLARIO; Schagger, 2006, Nat Protoc).

Western Blot Analysis

Proteins were resolved on 8%, 10%, 15% or 4-20% tris-glycine gels, and for amyloid-β or Ub immunoblotting 16% tris-tricine gel was used, transferred to nitrocellulose membranes (GE Whatman, 0.2 µm Pore Size). Western blot images were visualized by enhanced chemiluminescence (ECL). The images were captured by using an ImageQuant™ LAS 4000 imaging system (GE Healthcare) and quantitated by Image Studio™ Lite (LI-COR Biosciences). Primary antibodies were used at the following dilutions: 6E10 anti-amyloid-β for 3D cultures (1:1,000, 1:100, Biolegend, Cat. no. 803015); anti-PSEN1 (1:1,000, Cell Signaling Technology, Cat. no. 5643); anti-β-tubulin (1:1,000, Abcam, Cat. no. AB24629); anti-UBB+1 (1:1,000, custom made by Sigma for our lab), anti-ubiquitin (1:2,000, DAKO, Cat. no. Z0458), anti UCH-L1 (1:1,000, Abcam, Cat. no. ab8189), anti-GAPDH (1:10,000, Sigma, Cat. no. G9545), and anti-β-actin (1:10,000, Santa Cruz, Cat. no. sc-47778).

Dot Blot Analysis

Dot blot was performed as previously described (Kim et al., 2015, Nat Protoc). Primary antibodies were used at the following dilutions: 6E10 anti-amyloid-β (1:1,000, Biolegend, Cat. no. 803015); anti-UBB+1 (1:1,000, custom made by Sigma), anti MC1 (1:1,000) and anti PHF-1 (1:1,000).

Mouse Tissue

ApoE3-TR and ApoE4-TR mice were purchased from Taconic, in which the endogenous mouse ApoE was replaced by either human APOE3 or APOE4. The mice were back-crossed to wild-type C57BL/6J mice (2BL/610; Harlan Laboratories) for 10 generations and were homozygous for the ApoE3 (3/3) or ApoE4 (4/4) alleles. The ApoE genotype of the mice was confirmed by PCR analysis. Mice were anesthetized with ketamine and xylazine and perfused transcardially with phosphate-buffered saline. Brains were then removed and halved, and each hemisphere was further processed for either histologic or biochemical analysis. All experiments were approved by the Tel Aviv University Animal Care Committee. Every effort was made to reduce animal stress and to minimize animal usage (Liraz et al., 2013, Molecular neurodegeneration).

MS/MS Analysis of Aβ42 in 3D Culture

Samples were digested by trypsin, analyzed by LC-MS/MS on the HFX mass spectrometer (Thermo) and identified by Discoverer software version 1.4 vs the human Uniprot database and against decoy databases (in order to determine the false discovery rate (FDR) and vs the specific sequences of the interested proteins using the Mascot and Sequest search engine. Semi quantitation was done by calculating the peak area of each peptide.

Neural Induction of iPSCs in a Monolayer Culture System iPS cells cultured in 10 cm$^2$ culture dishes. Poly-Ornithine/Laminin-coated plates were prepared. STEMdiff™ Neural Induction Medium required for initial seeding was supplemented with 10 µM Y-27632 (ROCK inhibitor, PEPROTECH®). Each 10 cm$^2$ plate of human iPS cells was inspected (previously maintained in mTeSR™1) and any areas of differentiated cells were aspirated. Each plate was rinsed once with 5-10 mL of sterile PBS. 3 mL of gentle cell dissociation reagent were added and incubated at 37° C. for 8-10 minutes. 5 mL of DMEM/F-12 were added and cells were collected into a 50 mL conical tube. Viable cells were counted using Trypan Blue and a hemocytometer. Cells were centrifuge at 300×g for 10 minutes and resuspended in an appropriate volume of STEMdiff™ Neural Induction Medium supplemented with 10 µM Y-27632 to achieve a seeding density of 200,000 cells/cm$^2$, of iPS cells. Cells were seeded onto poly-Ornithine/Laminin-coated plates. Medium was replaced daily with fresh STEMdiff™ Neural Induction Medium. Y-27632 is not required after seeding. After six to nine days in STEMdiff™ Neural Induction Medium cells are OCT4-negative and PAX6-positive. At this point, cultures are confluent and ready for passage using ACCUTASE™. Maintain NPCs in STEMdiff™ Neural Induction Medium until passage three, and in STEMdiff™ Neural Progenitor Medium thereafter (STEM CELL TECHNOLOGIES). Freezing, thawing, and maintenance protocols are in STEMCELL TECHNOLOGIES website.

Statistics

All statistical analyses were performed using two-tailed unpaired Student's t-test. All experiments were repeated at least twice and performed in experimental triplicates. Images are representative of three independent wells. Data in graphs are expressed as mean values±s.e.m.

Example 1

Development of a UBB+1-Based 3D Human Neuronal System

To examine the role of UBB+1 in triggering AD, a 3D human neuronal system was established. A thin-layer of 3D cultures was used for immunocytochemistry and a thick-layer of the 3D cultures was used for molecular and biochemical analyses.

Figure 6A:
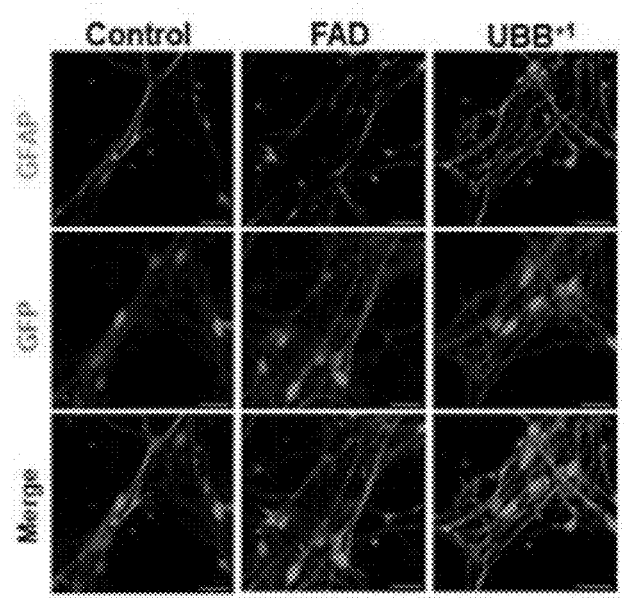
FIGS. 6A-6C include fluorescent micrographs showing neuronal and glial markers in control, FAD and UBB$^{+1}$ 3D cultures. (6A-6C) Representative images of control, FAD and UBB$^{+1}$ differentiated ReN cells immunostained for (6A) GFAP, (6B) NRB 2, and (6C) Tyrosine hydroxylase (TH) expression indicates proper differentiation in 3D 6-week old neuronal cultures. Scale bars: 20 μm (6A-6C). Experiment was repeated at least twice.
Figure 6B:
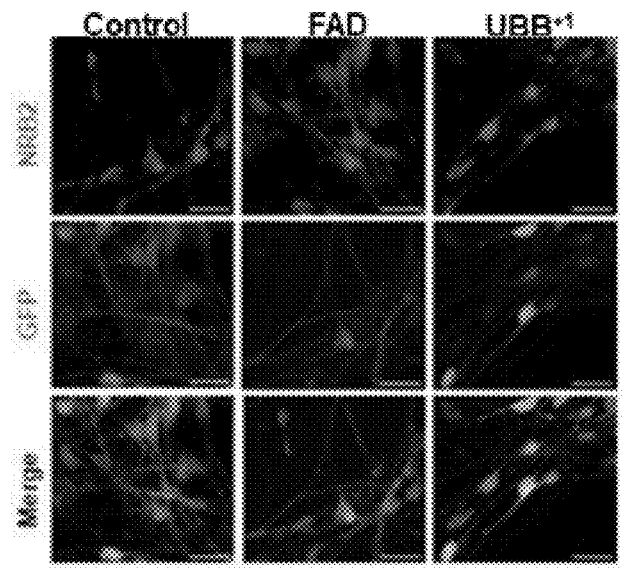
Figure 6C:
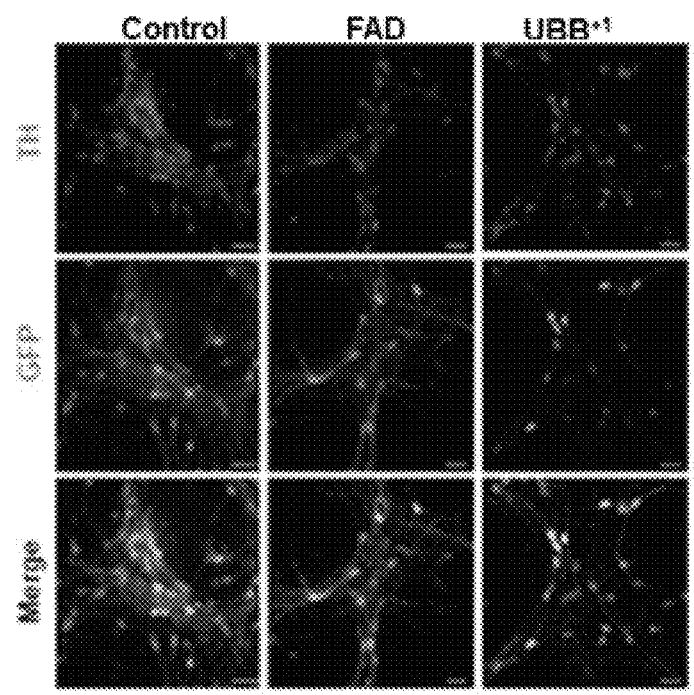

The inventors established a 3D human neuronal system using normal human neuronal progenitor ReN cells, which carry an ApoE ε3/ε3 genotype (and not the ε4 allele associated with AD). The inventors transduced ReN cells with GFP lentiviral vector encoding UBB$^{+1}$ (FIG. 1A) and performed sorting followed by differentiation in 3D to neuronal cultures (FIG. 5). In parallel, the inventors established a separate FAD line by transducing ReN cells with mCherry lentiviral vectors encoding for human β-amyloid precursor protein (APP) with both K670N/M671L (Swedish) and V717I (London) mutations (APPSL), coupled with expression of presenilin 1 with the ΔE9 mutation (PSEN1ΔE9). The top 2% of fluorescent APP$^{SL}$PSEN1$^{ΔE9}$ (FAD) or UBB$^{+1}$ cells were then either analyzed for protein expression (FIG. 5) or embedded in Matrigel for a duration of 3-8 weeks (FIG. 1A). Both confocal microscopy and western blot analyses indicated transduction efficiency, which resulted in high expression of transduced FAD or UBB$^{+1}$. Various markers of neuronal and glial cells such as GFAP, NRB2 and TH, indicated proper differentiation (FIG. 6). Importantly, no effect on cellular differentiation was observed upon either FAD or UBB$^{+1}$ transduction (FIG. 6).

Figure 1B:
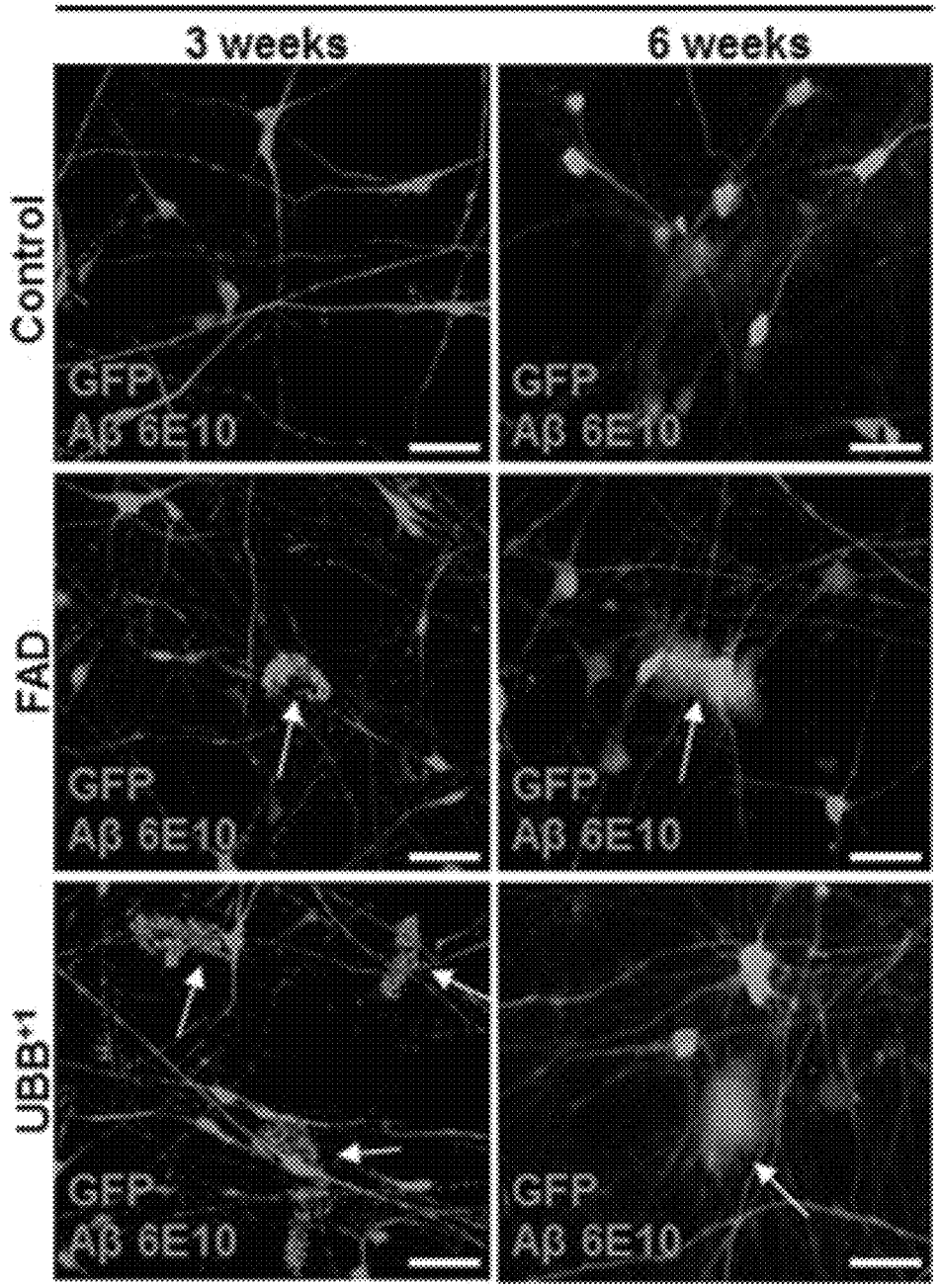
Figure 7A:
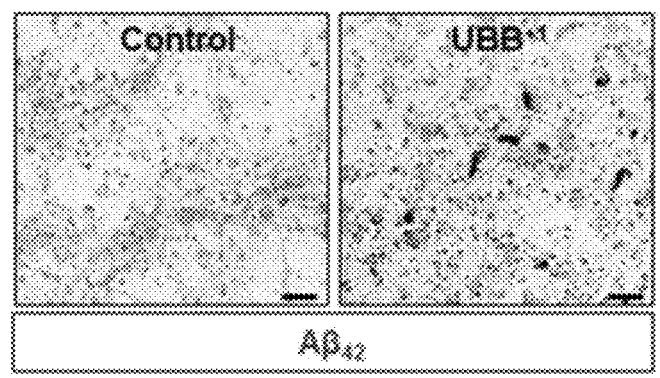
Figure 7B:
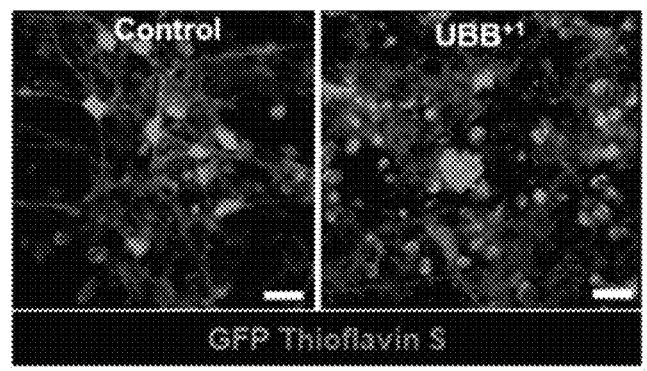

As early as three weeks post embedding, expression of UBB$^{+1}$ alone was sufficient to trigger formation of distinct plaques that were positively stained with two different anti-Aβ antibodies, Aβ 6E10 and Aβ 3D6 (FIG. 1B). Plaque formation at three weeks was similar to that observed in 3D FAD cultures (FIGS. 1B-1C). Distribution of these Aβ plaques grew with time and after an additional three-week period a four-fold increase in the number of Aβ plaques in UBB$^{+1}$ cultures was detected (FIGS. 1B-1C). Given that both Aβ antibodies indicated a similar increase in the abundance of plaque formation upon UBB$^{+1}$ expression substantiated that these are indeed bona fide plaques. Nevertheless, to rule out the possibility of autofluorescence affecting our analysis, we also performed immunohistochemistry with the Aβ 6E10 antibody, which labelled Aβ plaques in the UBB$^{+1}$ culture (FIG. 7).

To substantiate the amyloid nature of these plaques, the inventors also stained six-week-old cultures with the classical Thioflavin S dye, which specifically marks amyloid plaques. In agreement with our findings, Thioflavin S staining revealed numerous plaques upon UBB$^{+1}$ expression but not in control cultures (FIG. 7). To verify the findings that UBB$^{+1}$ expression is sufficient to drive Aβ plaque formation, the inventors employed additional complementary assays. First, the inventors extracted proteins from six-week-old thick 3D cultures and immunoblotted the SDS- and formic acid (FA)-solubilized fractions utilizing the anti-Aβ 6E10 antibody. In line with previous findings, the inventors observed heightened Aβ levels in UBB$^{+1}$ cultures (FIGS. 1D-1E). Additionally, dot-blot analysis of FA-soluble fractions from three independent UBB$^{+1}$ 6-week-old cultures revealed Aβ is detected specifically in UBB$^{+1}$ cultures (FIG. 1F). Furthermore, mass spectrometry (MS/MS) analysis performed on the SDS-soluble fraction revealed a 4-fold increase in intensity of APP— derived peptides in the UBB$^{+1}$ sample compared to control (FIG. 7). Therefore, the herein disclosed data strongly indicate that expression of UBB$^{+1}$ is sufficient to drive Aβ plaque formation in human neurons.

Figure 1H:
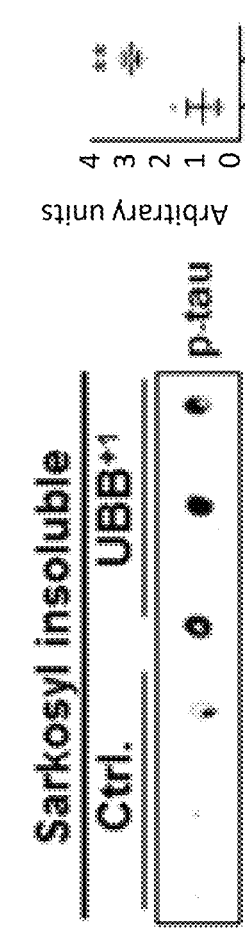
Figure 1I:
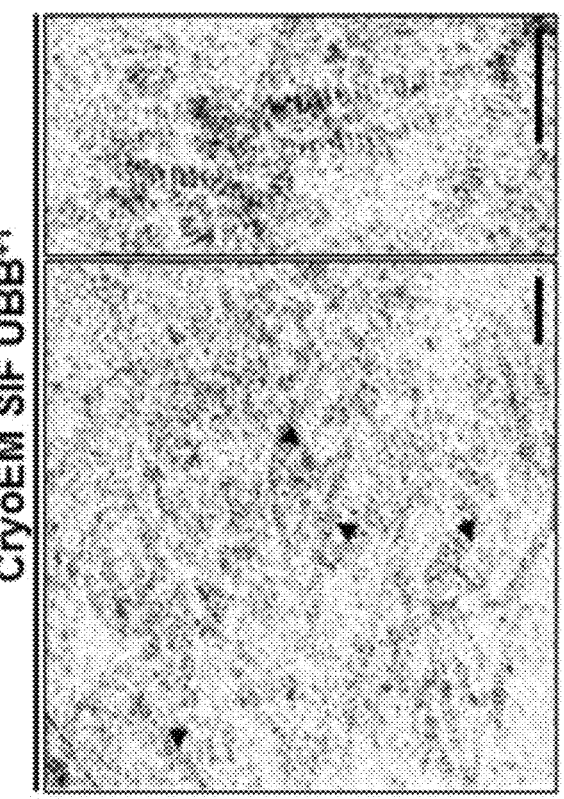
Figure 1G:
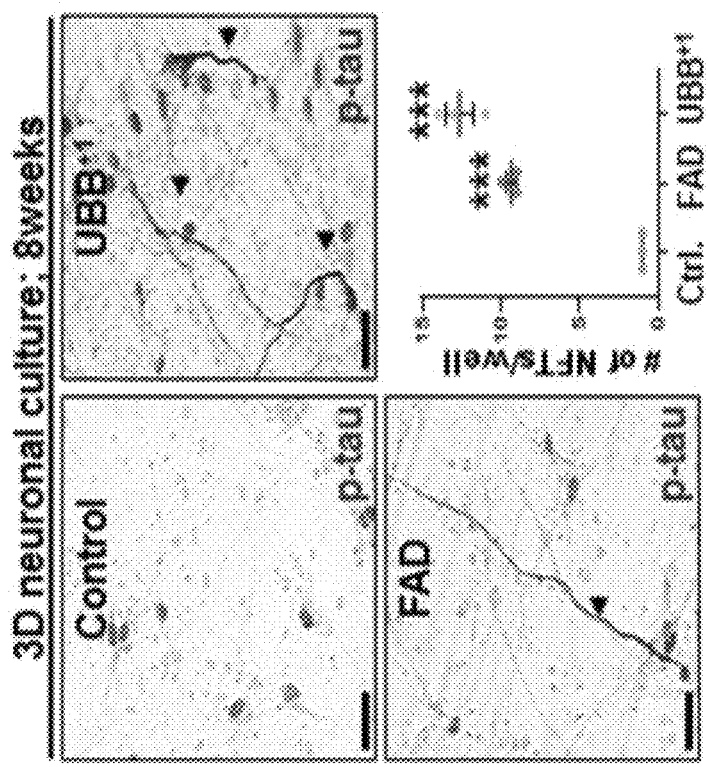

As NFTs represent the second hallmark of AD, the inventors investigated whether expression of UBB$^{+1}$ could result in the formation of NFTs. Immunohistochemistry clearly showed that, in contrast to control, both eight-week-old FAD and UBB$^{+1}$ cultures exhibit pronounced and easily detectable NFT-like structures. These NFTs displayed classic tangle morphology and were positive for phosphorylated-tau protein (FIG. 1G). To further verify these findings, the inventors extracted proteins from eight-week-old thick 3D cultures and performed dot-blot analysis of sarkosyl-insoluble fractions utilizing the p-tau paired helical filaments-1 (PHF-1) antibody. In line with our previous findings, the inventors detected heightened p-tau levels in four independent UBB$^{+1}$ cultures (FIG. 1H). Next, cryogenic transmission electron microscopy (cryo-TEM) was employed to visualize the filamentous assemblies of tau. Sarkosyl-insoluble fractions isolated from eight-week UBB$^{+1}$ cultures were analyzed by TEM (FIG. 1I). Remarkably, UBB$^{+1}$ was able to produce fibers that exhibit the typical characteristics of brain-derived Alzheimer PHFs. The paired helical appearance displayed a width of ~16 nm with a 2 nm-spacing stacked pattern along the filament, which reflects the organization of protein units and its periodical structure. Finally, an anti-tau (tau46) antibody labeled filamentous structures isolated from UBB$^{+1}$ samples (Data not shown). Taken together, the herein disclosed data strongly suggest that expression of UBB$^{+1}$, without any additional genetic risk factors, can recapitulate critical aspects of AD pathology in human neurons.

Figure 2A:
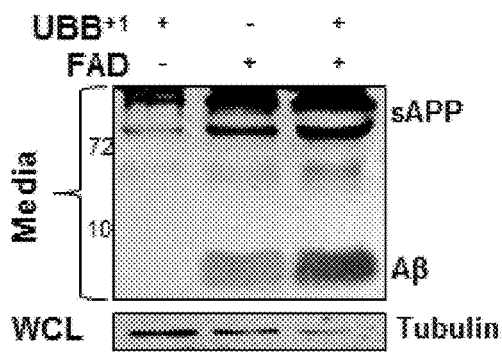
FIGS. 2A-2J include graphs and micrographs showing that $UBB^{+1}$ binds UCH-L1 and inhibits APP ubiquitination. (2A) Western blot of Aβ from conditioned medium collected from HEK293FT cells transfected with FAD, $UBB^{+1}$ or both, showing Aβ monomer. (2B) Immunoblot of Aβ (6E10) in conditioned medium collected from HEK293FT cells overexpressing the UBB gene in FAD, $UBB^{+1}$, FAD/$UBB^{+1}$. (2C) Mass spectrometry (MS/MS) analysis of proteins co-purified with $UBB^{+1}$ identified several AD-related binding-candidates, including ALDOA, LDHB and UCH-L1. Bubble size represents total MS peek intensity of peptides for each protein. (2D) Co-immunoprecipitation (Co-IP) performed with anti-$UBB^{+1}$ antibody in HEK293FT cells expressing $UBB^{+1}$ or an empty vector immunoblotted against UCHL-1 and $UBB^{+1}$. WCL; whole cell lysate. (2E) Affinity purification of STREP-UCH-L1 from HEK293FT cells co-expressing $UBB^{+1}$. (2F) Co-IP of $UBB^{+1}$ from HEK293FT cells expressing one of three $UBB^{+1}$ constructs; $UBB^{+1}$, STREP-$UBB^{+1}$ or myc-$UBB^{+1}$ and co-transfected with either one copy of ubiquitin or the entire UBB gene. (2G) Immunoblot of APP in HEK293FT cell extract transfected with FAD together with $UBB^{+1}$, UCH-L1 or treated with UCH-L1 specific chemical inhibitor (LDN57444). (2H) IP of APP from HEK293FT cells transfected with FAD together with either $UBB^{+1}$, UCH-L1 or both, showing ubiquitination levels of APP. (2I) IF images showing UCH-L1 expression (top panel) and Aβ deposits (white arrows, bottom panel) in three+one weeks differentiated $UBB^{+1}$ and $UBB^{+1}$/UCH-L1 3D cultures. Three week $UBB^{+1}$ cultures were transduced with UCH-L1 and harvested one-week post transduction. (2J) Quantification of the mean total number of extracellular Aβ deposits/well in $UBB^{+1}$ and $UBB^{+1}$/UCH-L1 cultures from FIG. 2I demonstrating decreased plaque pathology in $UBB^{+1}$/UCH-L1 cultures compared to $UBB^{+1}$ alone [n=3 independent wells]. β-tubulin or GAPDH levels were used as loading controls as indicated. P values were determined by unpaired two-tailed Student's t test where ***P<0.001. Error bars represent±s.e.m. Scale bars: 50 μm (2I, top panel), 20 μm (2I, bottom panel).
Figure 2B:
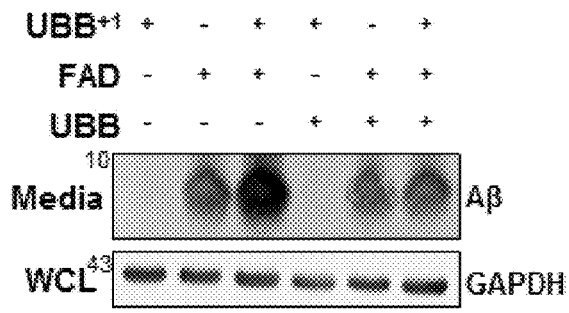

Next, the inventors investigated the underlying mechanism of Aβ plaque formation upon induction of UBB$^{+1}$ expression. As a first step, the inventors collected media to examine secreted Aβ$_{42}$ levels from transfected FAD and UBB$^{+1}$ HEK293FT cells. Co-transfection of UBB$^{+1}$ and FAD resulted in increased levels of secreted A$\beta_{42}$ compared to FAD alone, as measured either by immunoblotting or A$\beta_{42}$ ELISA kit (FIG. 2A). Of note, overexpression of ubiquitin diminished levels of secreted A$\beta_{42}$, emphasizing that UBB$^{+1}$ may interfere with ubiquitin signaling in APP processing (FIG. 2B).

Figure 2C:
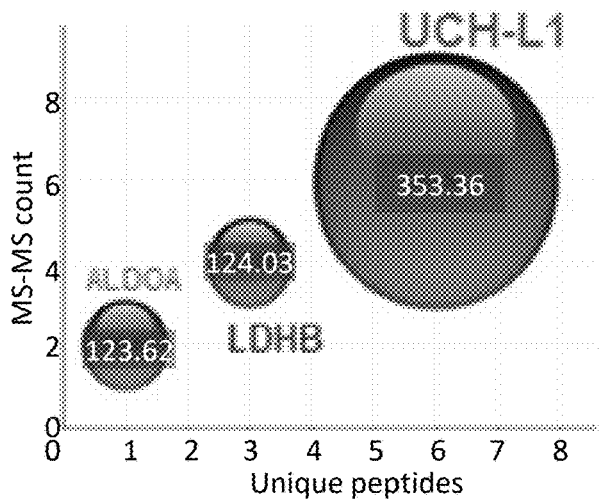

The inventors hypothesized that since UBB$^{+1}$ is unable to ubiquitinate proteins but can still be recognized as a functional ubiquitin, it could interfere with proteins that recognize single ubiquitin domains and in doing so affect ubiquitination of APP. To test this hypothesis, the inventors screened for potential binding partners by co-immunoprecipitation (co-IP) of UBB$^{+1}$. MS/MS analysis identified several AD-related candidates including UCH-L1 (Ubiquitin C-terminal hydrolase L1), ALDOA, and LDHB (FIG. 2C).

Figure 2D:
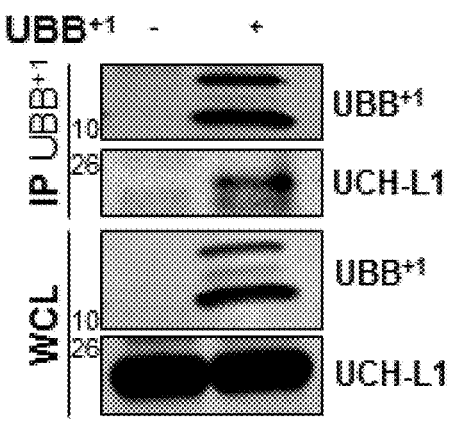
Figure 2E:
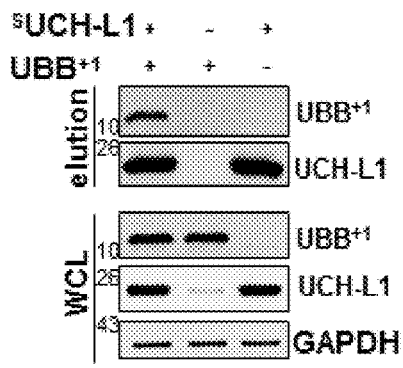
Figure 2F:
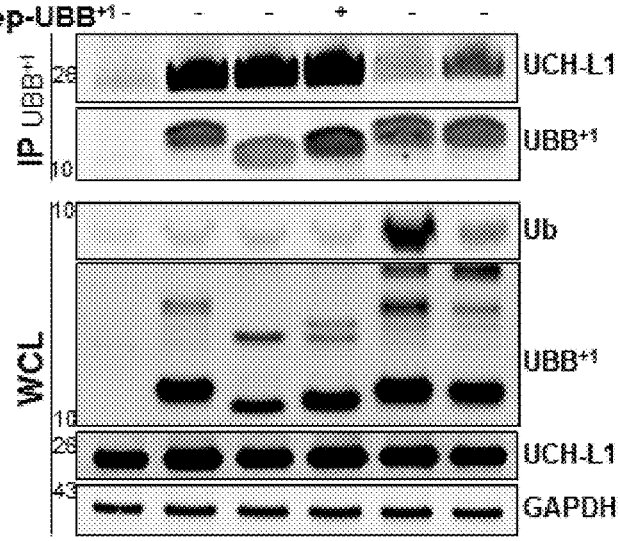
Figure 8A:
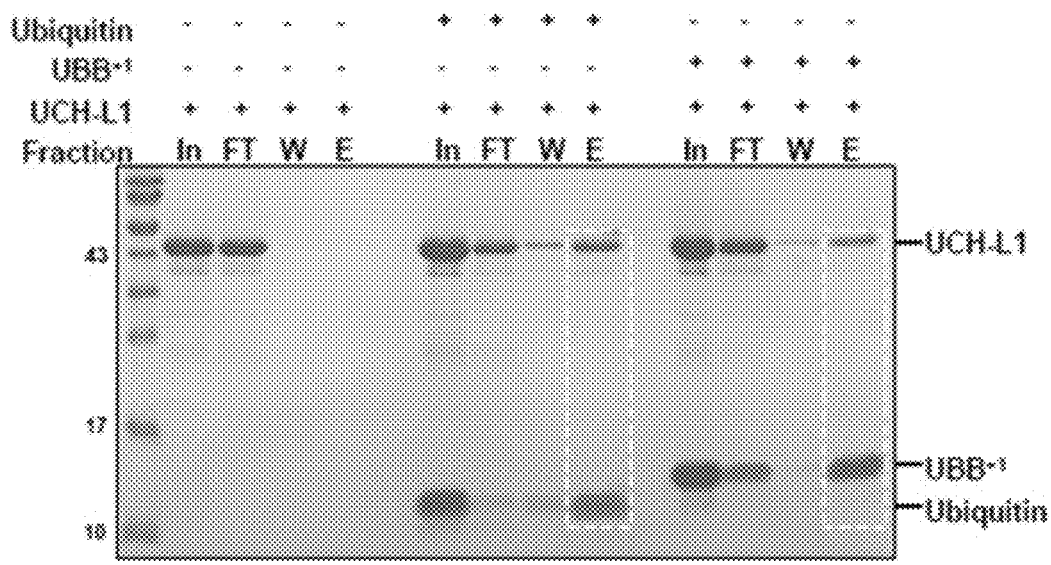
Figure 8B:
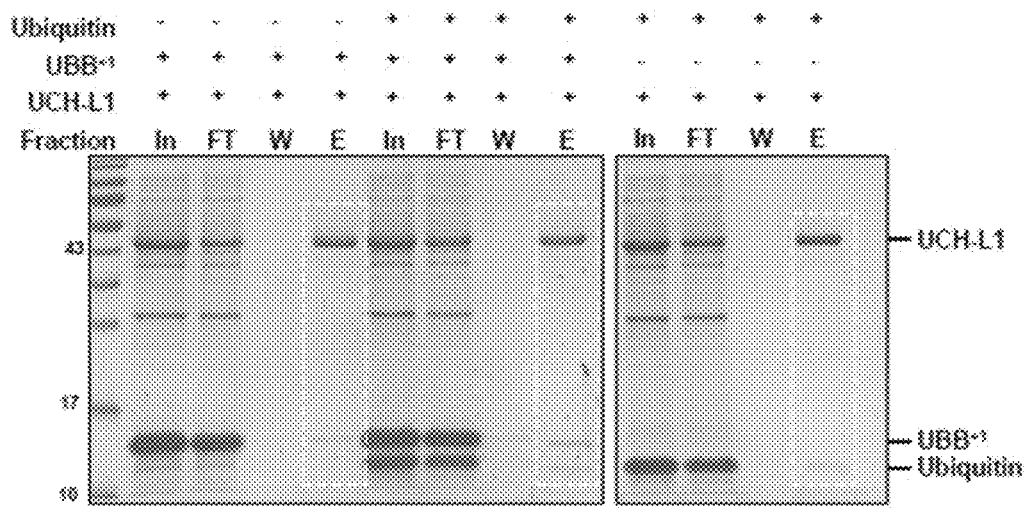
Figure 8C:
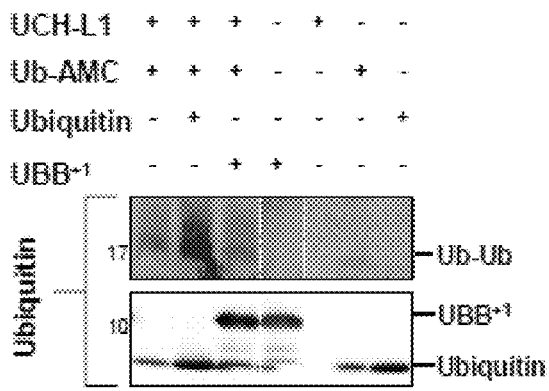
Figure 9F:
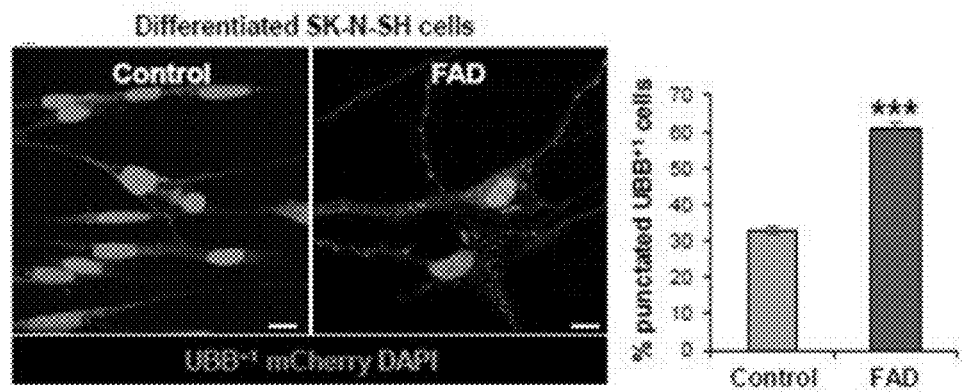
Figure 9F:
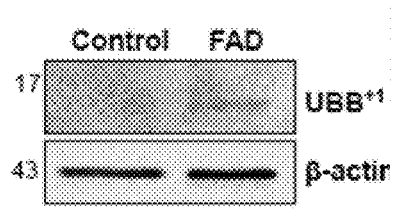

Given that UCH-L1, which was the top candidate in the herein disclosed MS/MS analysis, is extremely abundant in the brain and its dysfunction is implicated in neurodegeneration, the inventors focused on the relationship between UBB$^{+1}$ and UCH-L1. First, the inventors confirmed the interaction of these two proteins by immunoprecipitating UBB$^{+1}$ from cell extract and immunoblotting for UCH-L1 (FIG. 2D). Next, to further substantiate that UCH-L1 binds to UBB$^{+1}$, the inventors performed affinity purification of STREP-UCH-L1 from UBB$^{+1}$/STREP-UCH-L1 transfected HEK293FT cells (FIG. 2E). In a reciprocal co-IP experiment, the inventors precipitated endogenous UCH-L1 from cells expressing UBB$^{+1}$ (data not shown). Finally, different UBB$^{+1}$ constructs tagged by either STREP or Myc (strep-UBB$^{+1}$, Myc-UBB$^{+1}$, respectively) also efficiently bound endogenous UCH-L1 (FIG. 2F). To examine whether UBB$^{+1}$ and UCL-H1 interact directly, the inventors used either recombinant UCH-L1 or UBB$^{+1}$ as a trap for affinity purification of the potential partner (FIG. 8). These experiments revealed the direct pairwise interaction between UBB$^{+1}$ and UCH-L1. Having validated that UCH-L1 can also bind free ubiquitin as has been reported (FIG. 8), the inventors next postulated that UBB$^{+1}$ might compete with ubiquitin for its binding. For this aim, the inventors immunoprecipitated UBB$^{+1}$ upon overexpression of either one or triple copies of the ubiquitin gene above endogenous levels (FIG. 2F). The inventors found that elevated ubiquitin outcompeted UBB$^{+1}$ for its interaction with UCH-L1 in a dose-dependent manner (FIG. 2F).

Figure 2G:
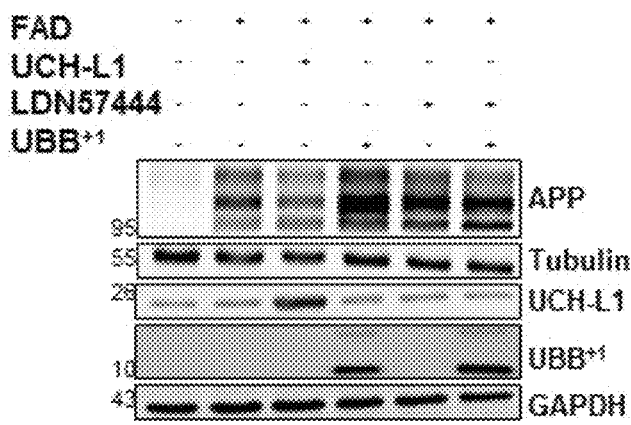
Figure 2H:
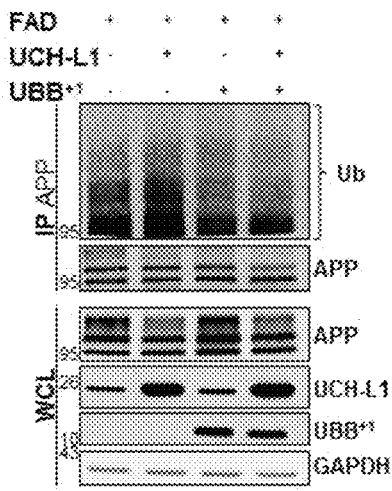

UCH-L1 is a hydrolase for short ubiquitin extensions, however, it was also shown to bind and stabilize free ubiquitin. Holding on to ubiquitin (its activated product) could explain the dramatic observation of its ability to ligate ubiquitin onto other substrates. In this regard, it has been shown that UCH-L1 can bind APP and lead to its ubiquitination. Furthermore, inhibition of UCH-L1 by the specific compound LDN57444 attenuates APP ubiquitination and its degradation by lysosome. Having found that UBB$^{+1}$ could interfere with the hydrolase and ligase activities of recombinant UCH-L1 (FIG. 8), the inventors hypothesized that UBB' might similarly diminish APP ubiquitination in cells. Indeed, UBB$^{+1}$ expression increased APP protein levels (as did treatment with LDN57444), yet simultaneous expression of UBB$^{+1}$ and LDN57444 treatment did not lead to an additive effect on APP levels (FIG. 2G), suggesting that UBB$^{+1}$ acts via UCH-L1. Strikingly, expression of UBB$^{+1}$ decreased APP ubiquitination (FIG. 2H). Furthermore, this effect was mitigated by overexpression of UCH-L1 (FIG. 2H). By inhibiting UCH-L1 ligase activity on APP, the inventors found that UBB$^{+1}$ decreases ubiquitination of APP that directs its degradation at the lysosome (data not shown).

Figure 2I:
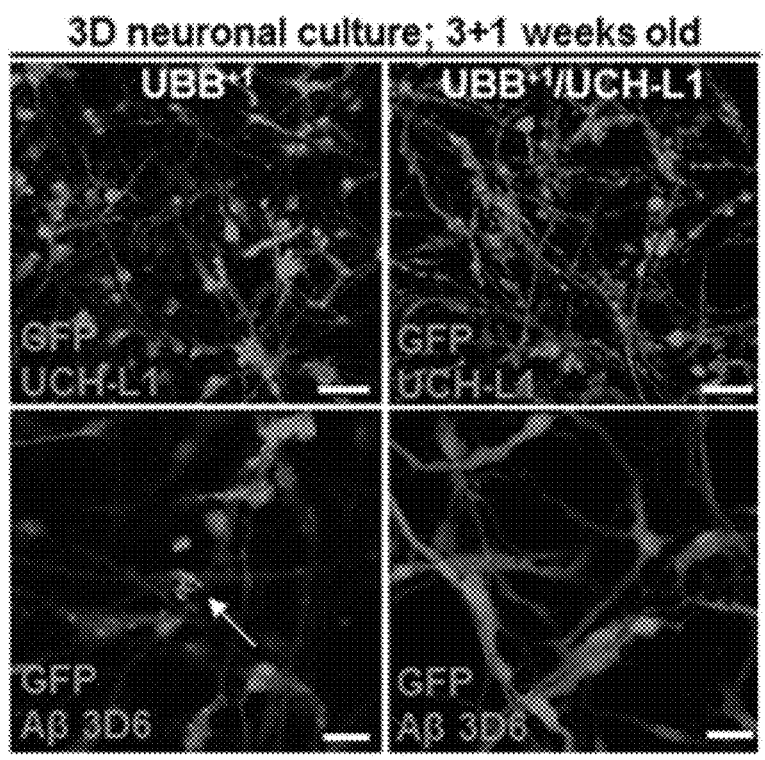
Figure 2J:
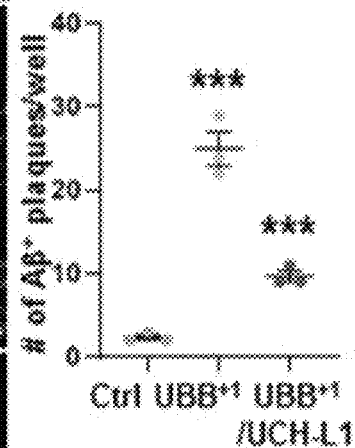

Next, the inventors employed the 3D neuronal model to examine the key role UCH-L1 plays in mediating UBB$^{+1}$-dependent effects on A$\beta$ plaques. The inventors transduced 3D cultures with lentiviral UCH-L1 encoding vectors 3-weeks post plating, a time point during which the 3D networks encompass A$\beta$ plaques. The inventors harvested the cultures merely one week post transduction and found that UCH-L1 was homogenously expressed throughout the culture (±98% of cells, FIG. 2I). Strikingly, not only did the expression of UCH-L1 result in a dramatic improvement in the morphology of individual neurons but the number of plaques observed in the 4 week old cultures was significantly lower compared to UBB$^{+1}$ alone (FIG. 2J). This number of A$\beta$ plaques was estimated at ±10 plaques per well which is identical to the number seen at 3 weeks (pre-transduction) strongly suggesting that UCH-L1 was sufficient to completely attenuate the development in AD pathogenesis (FIGS. 2I-2J).

Figure 3B:
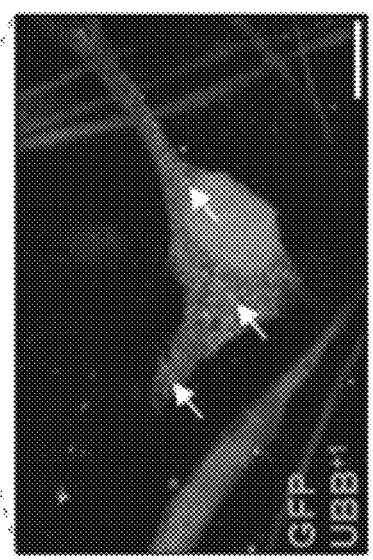
FIGS. 3A-3G include micrographs and graphs showing that $UBB^{+1}$ naturally accumulates early on in Alzheimer's disease models. (3A) Representative confocal images of three-week-old 3D neuronal cultures immunostained against $UBB^{+1}$ showing positive staining in FAD cultures. (3B) Zoom-in on a single 3D-differentiated FAD cell showing distinct $UBB^{+1}$ foci in the cell body (white arrows). (3C) Positive Aβ (3D6) and $UBB^{+1}$ co-staining in plaque-like aggregates of 3D FAD cultures. $UBB^{+1}$ positive cells were also observed in the vicinity of Aβ plaques. (3D) Immunostaining of $UBB^{+1}$ and MAP2 in one- and four-month-old ApoE-TR mice, showing positive staining mostly in the dentate gyrus (DG) area of the hippocampus of ApoE4-TR mice compared to ApoE3-TR controls. (3E) Co-immunostaining of UBB$^{+1}$ (red), MAP2, (green) and GFAP in four month old ApoE-TR mice, showing UBB$^{+1}$ is specifically localized to neurons. (3F) Proteins isolated from the hippocampus of ApoE-TR mice were immunoblotted using anti-UBB$^{+1}$ antibody. β-actin was used as loading control. (3G) Densitometry of UBB$^{+1}$ immunoblot from five ApoE4-TR and ApoE3-TR mice, showing relative UBB$^{+1}$ protein levels. P values were determined by unpaired two-tailed Student's t test where *** P<0.001. Error bars represent±s.e.m. All experiments were repeated at least twice. Scale bars: 50 μm (3A), 10 μm (3B, 3E), and 20 μm (3C, 3D).
Figure 3A:
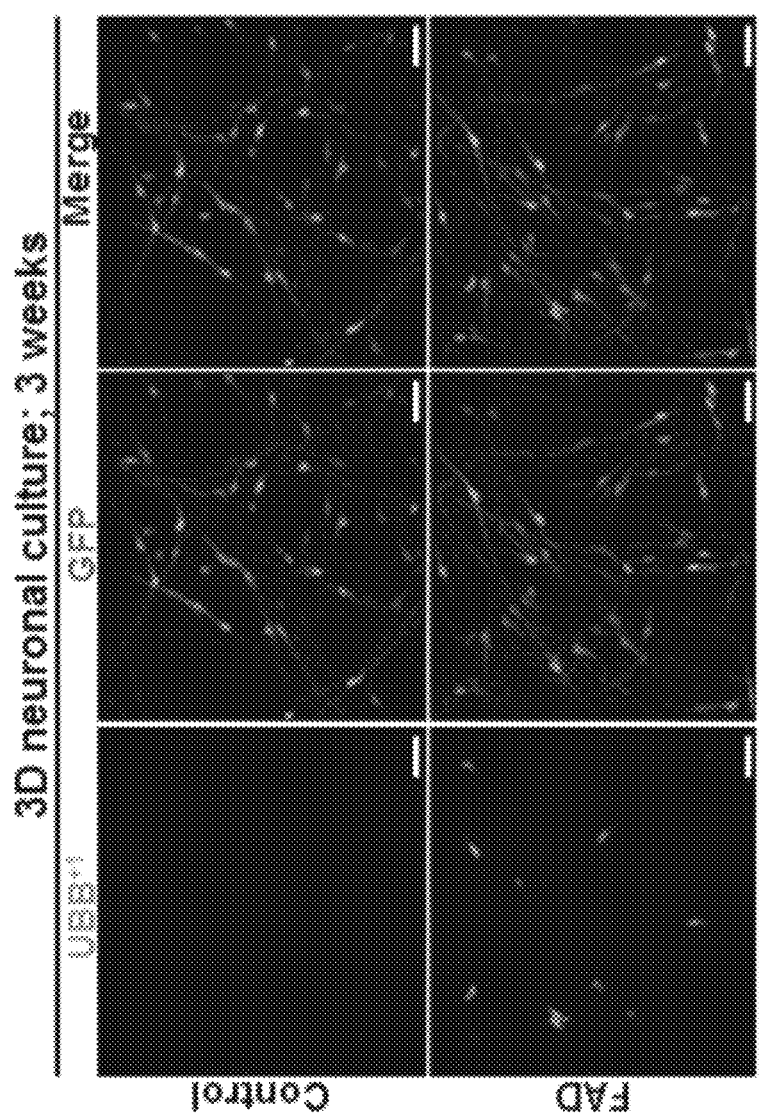
Figure 3C:
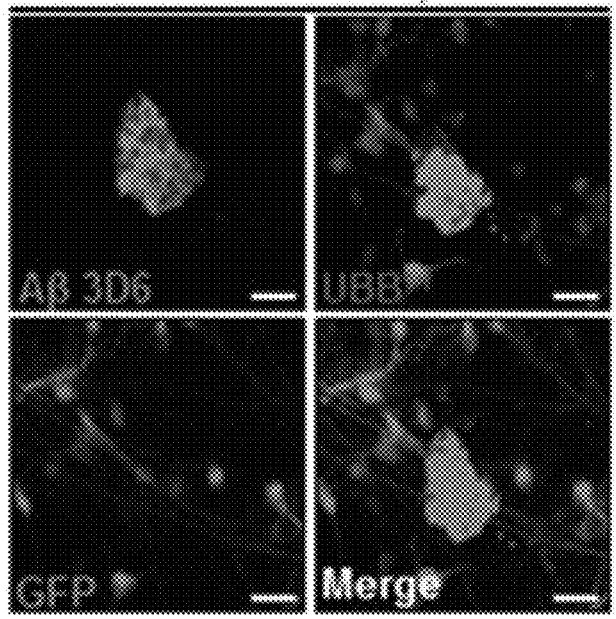

The herein disclosed findings indicate that UBB$^{+1}$ expression is sufficient to increase A$\beta$ secretion and plaque formation in a manner dependent upon UCH-L1 activity. As the ability of UBB$^{+1}$ to inhibit UCH-L1 activity was dose dependent (FIG. 2F), the inventors investigated whether known conditions that lead to AD hallmarks involve UBB$^{+1}$ accumulation. Exploiting the advantage of the recent 3D FAD neuronal model, the inventors examined the presence of UBB$^{+1}$. Indeed, UBB$^{+1}$ was highly expressed in the FAD culture distributed as distinct foci throughout the soma, axons and dendrites, yet could barely be detected in control (FIG. 3A). Interestingly, UBB$^{+1}$ positive cells were localized in the vicinity as well as within plaque-like structures (FIG. 3C). These findings are in agreement with the previously reported observation that 100% of post-mortem brains from AD patients exhibit pervasive UBB$^{+1}$ in plaques and NFTs.

Accumulation of UBB$^{+1}$ was a common feature of a number of AD models. The inventors determined that UBB$^{+1}$ accumulated significantly as puncta throughout the cytoplasm of SK-N-SH cells carrying the same FAD mutations as described above (FIG. 10). Quantitative analysis indicated approximately six-fold increase in the number of UBB$^{+1}$ positive cells upon FAD expression (FIG. 10). An even greater number of cells with UBB$^{+1}$ puncta were counted in FAD SK-N-SH cells upon differentiation (FIG. 10). In order to verify these findings, immunoblot analysis also pointed to accumulation of UBB$^{+1}$ protein in FAD SK-N-SH lysates (FIG. 10), and in the FA-soluble fraction of proteins extracted from six-week-old FAD cultures (FIG. 10).

Figure 3D:
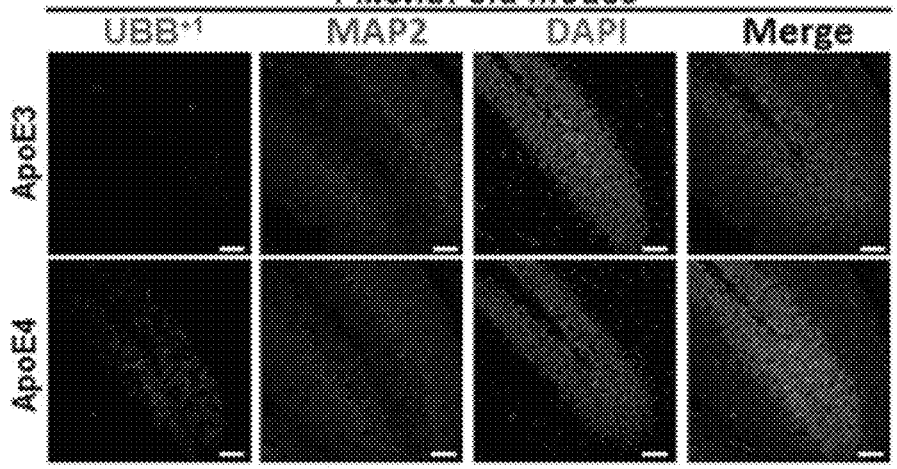
Figure 3D:
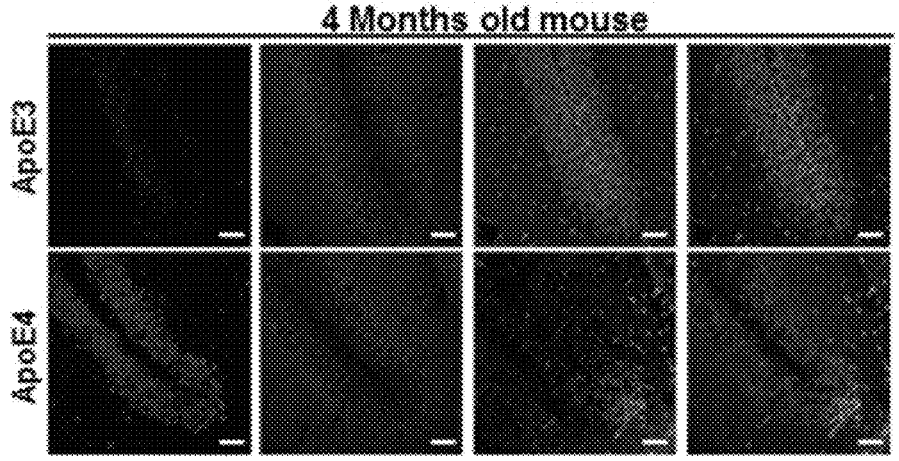
Figure 3E:
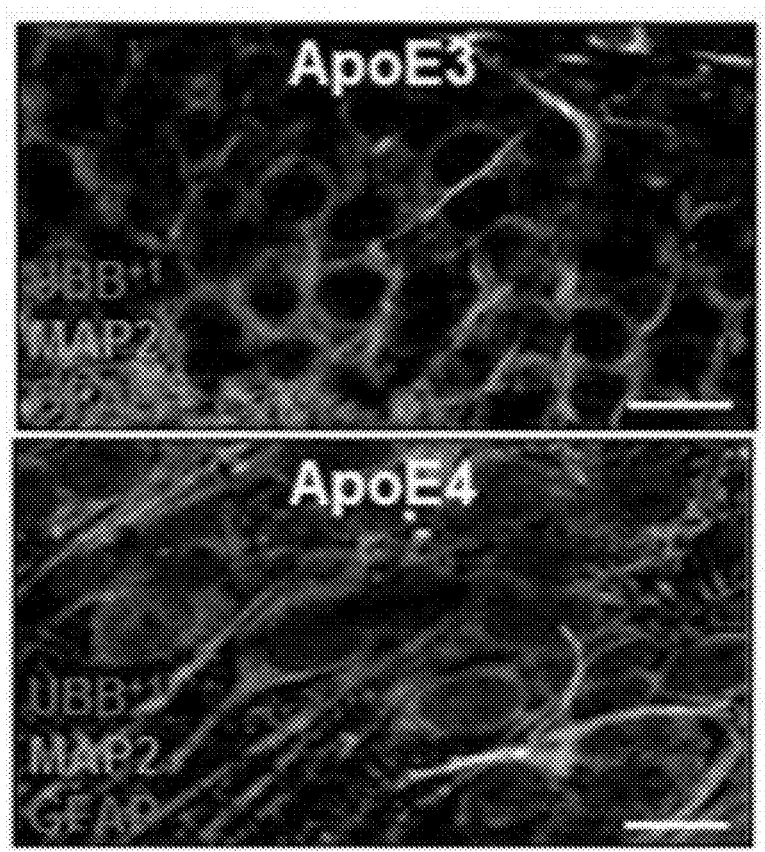
Figure 3F:
Figure 3G:
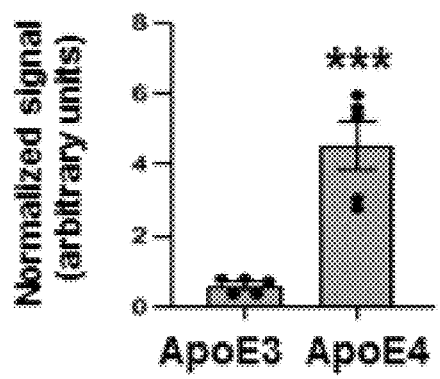
Figure 10A:
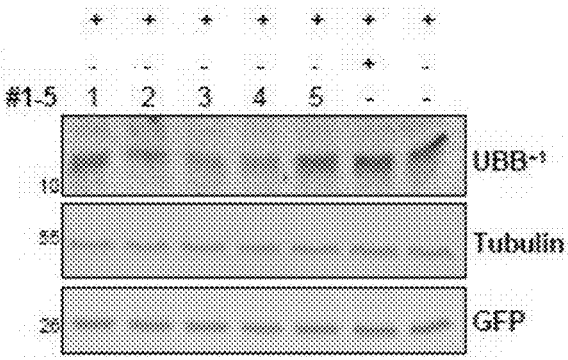
FIGS. 10A-10F include micrographs and graphs showing the establishment of shRNA for UBB$^{+1}$ in 3D cultures. (10A) Western blot of HEK 293 FT cells transfected with both UBB$^{+1}$ and five different UBB$^{+1}$ shRNA/scrambled control. (10B) Quantification of UBB$^{+1}$ protein levels showing a decrease of ~60% in HEK 293 cells carrying UBB$^{+1}$ and shRNAs #3/4. (10C) Western blot analysis of total ubiquitin in HEK 293 FT cells carrying shRNA #3 against UBB$^{+1}$ or scrambled control. Both HMW and mono-ubiquitin were tested showing that UBB$^{+1}$ shRNA has no effect on total ubiquitin levels in the cell. (10D) FACS plots of ReN cells that were transduced with polycistronic H2B-GFP and mCherry lentiviral vectors: Control (scrambled shRNA-H$_2$B-GFP+mCherry), shUBB$^{+1}$ (shUBB$^{+1}$-H2B-GFP+mCherry), FAD (APP$^{SL}$-PSEN1$^{\Delta E9}$-mCherry 30 scrambled-H2B-GFP) and FAD+shUBB$^{+1}$ (APP$^{SL}$-PSEN1$^{\Delta E9}$-mCherry+shUBB$^{+1}$-H2B-GFP). Cells were then enriched based on GFP and mCherry signals by FACS. Black dotted boxes indicate sorted cell population (top 2%). (10E) Immunofluorescence of 3D neurons expressing FAD+shUBB$^{+1}$ showing a decrease in UBB$^{+1}$ protein levels compared to FAD scrambled control. (10F) Mean number of small and large Aβ deposits in FAD and FAD+shUBB$^{+1}$ cultures [n=3 independent wells]. P values were determined by unpaired two-tailed Student's t test where **P<0.01. Error bars represent±s.e.m. Images are representative of three independent cultures and experiments were repeated twice. Scale bars: 20 µm (10E).
Figure 10B:
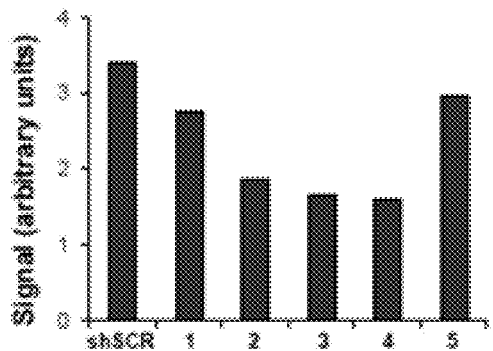
Figure 10C:
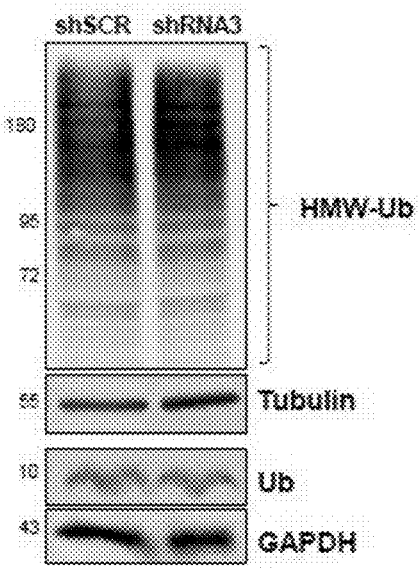
Figure 10D:
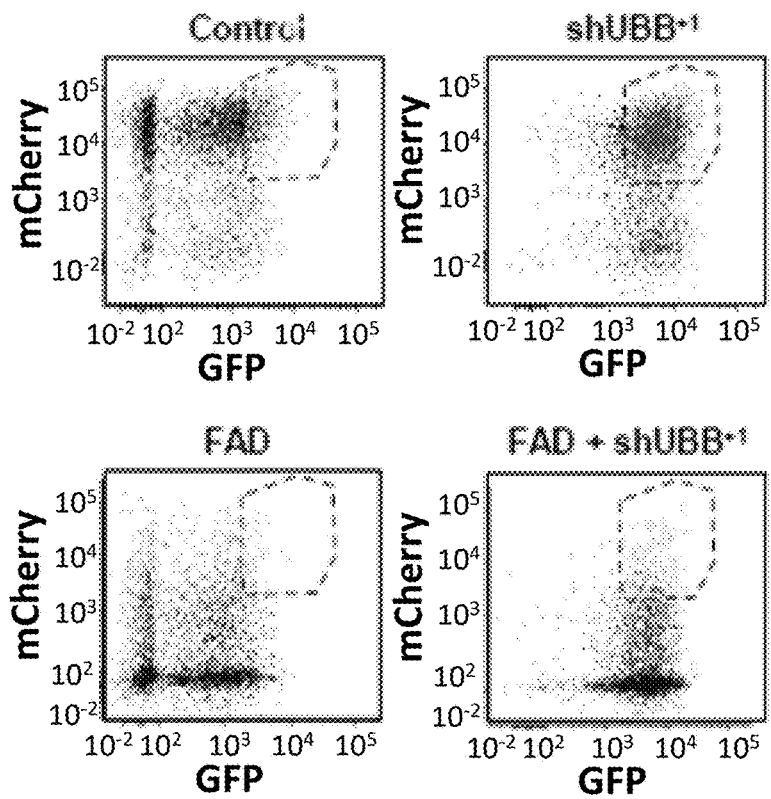
Figure 10E:
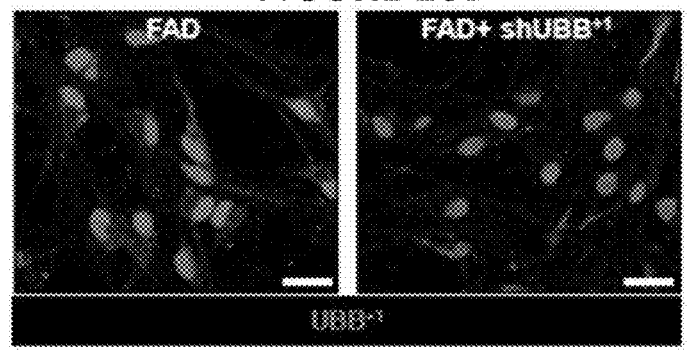
Figure 10F:
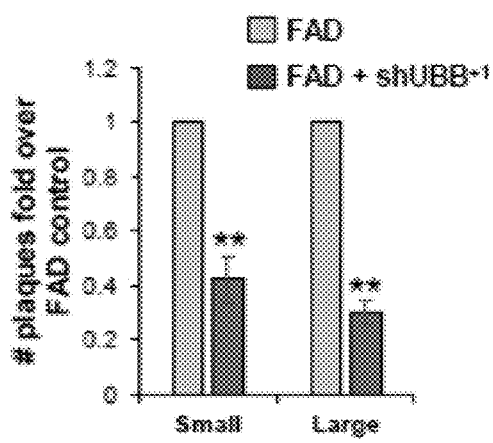

Next, the inventors set out to investigate whether UBB$^{+1}$ accumulates early on in AD models. For this, the inventors evaluated the presence of UBB$^{+1}$ in the mouse ApoE model of AD (ApoE-TR). ApoE4, in contrast to the non-pathogenic ApoE3 isoform, is the strongest genetic risk factor for late-onset AD and was recently shown to induce AD hallmarks in transgenic humanized mice and to increase A$\beta$ production in human neurons. First, the inventors examined the presence of UBB$^{+1}$ in hippocampal sections of one month old ApoE4-TR mice, a very early timepoint in the progression of AD-like pathogenesis in mice. The inventors identified UBB$^{+1}$ positive staining mostly in the dentate gyrus (DG) area of the hippocampus of ApoE4-TR mice compared to ApoE3-TR controls (FIG. 3D). Next, the inventors monitored the presence of UBB$^{+1}$ in two and four-month old ApoE mice (FIG. 3D). Co-staining with the neuronal and astrocyte MAP2 and GFAP markers revealed that UBB$^{+1}$ is specifically localized to neurons but not astrocytes in ApoE4-TR mice (FIG. 3E). To verify the immunostainings, the inventors obtained lysates from the hippocampus of four-month-old ApoE3/4-TR mice and observed that in contrast to the ApoE3 control mice, ApoE4 mice display significantly increased levels of UBB$^{+1}$ levels (FIGS. 3F-3G). Furthermore, the inventors examined the 3D FAD model for UBB$^{+1}$ early accumulation, and remarkably, UBB$^{+1}$ positive staining was seen as early as two-weeks FAD cultures (FIG. 10C). Therefore, the herein disclosed results indicate that increased expression of UBB$^{+1}$ is a shared feature of both familial and sporadic models of AD and that UBB$^{+1}$ accumulation is an event early on in AD pathogenesis.

As heightened expression of UBB$^{+1}$ had the capacity to drive AD hallmarks, the inventors next examined whether silencing its expression could reverse the classical phenotypes of AD. Of note, UBB$^{+1}$ is not a genetic mutation that can be edited back to the wild-type form[4]. Thus, the inventors aimed to silence UBB$^{+1}$ specifically without compromising expression of the UBB gene. As a first step, the inventors set out to generate the proper tools and produce efficient RNAi vectors for silencing UBB$^{+1}$. Notably, the classical UBB$^{+1}$ construct widely used in the field, was generated upon introduction of an NheI site between the ubiquitin moiety and the +1 extension of UBB$^{+1}$, which results in D79S amino acid substitution. Nevertheless, this has been elegantly shown to have no impact on the inhibitory capacity of UBB$^{+1}$. However, for the RNAi studies the inventors also generated an additional UBB$^{+1}$ construct (termed UBB$^{+1wt}$) which encodes the endogenous sequence of UBB$^{+1}$. The inventors examined a multitude of RNAi constructs due to high sequence similarity between UBB$^{+1}$ and UBB. However, these examined shRNA constructs either did not decrease the levels of UBB$^{+1}$ or impacted UBB levels (data not shown). Therefore, the inventors took an alternative RNAi approach aimed at generating a specific shRNA/miRNA sequence that could target both ectopic UBB$^{+1}$ and more importantly the endogenous one. This sequence [shRNA-UBB$^{+1}$ (shUBB$^{+1}$)] was designed to meet all the prerequisites of an ideal miRNA (FIG. 11A). The inventors co-transfected HEK293FT cells with either UBB$^{+1}$ or UBB$^{+1wt}$ together with a short hairpin RNA control (shSCR) or the shUBB$^{1}$. A dramatic decrease in UBB$^{+1}$ protein level was observed (83% vs UBB$^{+1}$ and 87% vs UBB$^{+1wt}$; FIG. 11B). Importantly, the effect of shUBB$^{+1}$ was specific, and it did not affect overall ubiquitin levels in the cell (FIGS. 11C-11D). Nevertheless, suppressing endogenous UBB$^{+1}$ decreased APP levels (FIG. 11D).

Figure 4F:
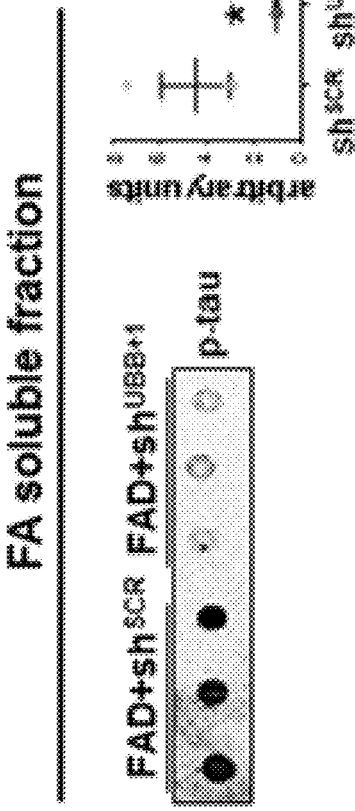
Figure 4G:
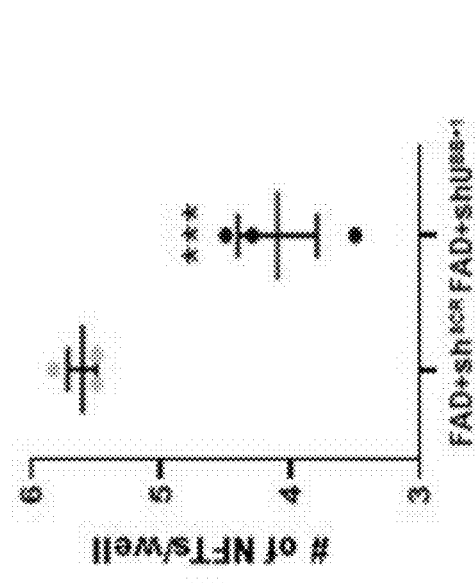
Figure 4H:
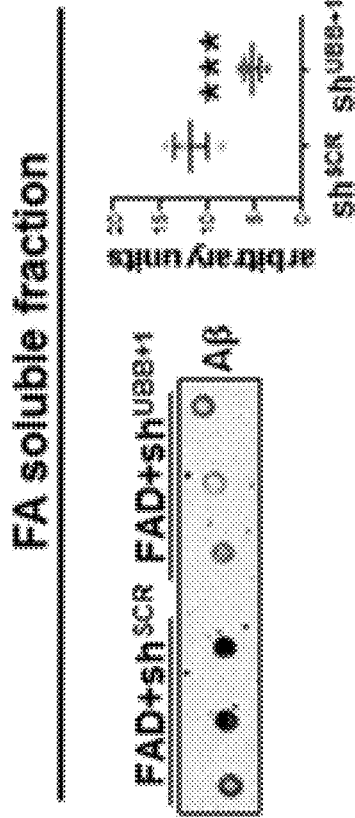
Figure 4I:
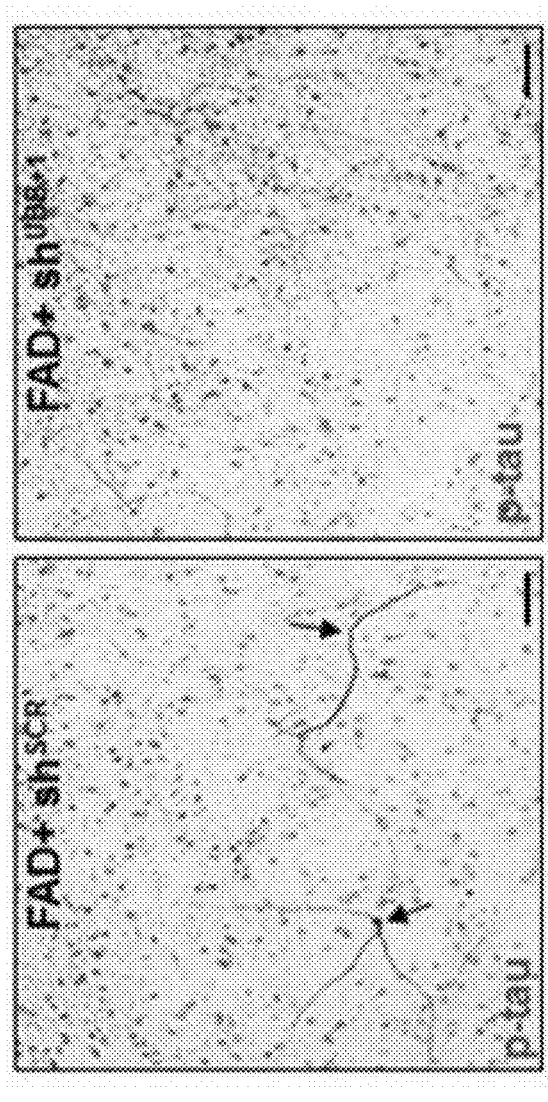
Figure 5A:
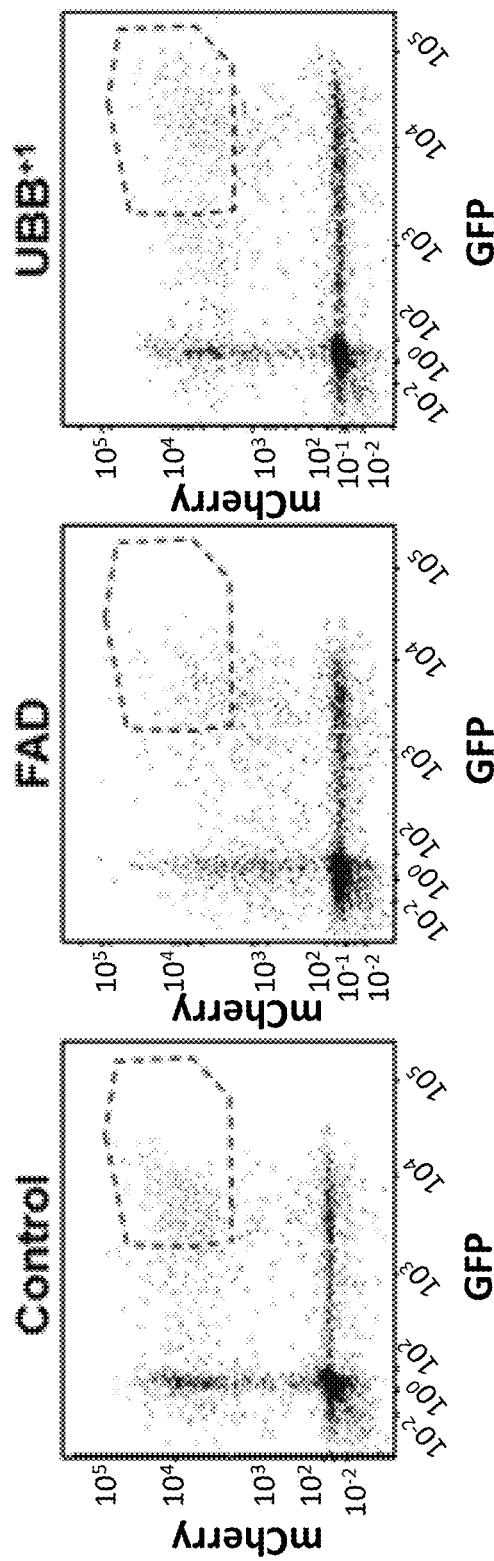
FIGS. 5A-5D include graphs and micrographs showing establishment of AD 3D human neuronal model. (5A) FACS sorting of ReN cells that were transduced with polycistronic GFP and mCherry lentiviral vectors: Control (GFP+ mCherry), FAD (APP$^{SL}$-PSENΔ$^{1E9}$-mCherry+GFP), and UBB$^{+1}$ (UBB$^{+1}$-GFP+mCherry). The cells were then enriched based on GFP and mCherry signals by FACS. Black dotted boxes indicate sorted cell population (top 2%). (5B) Representative fluorescence confocal microscopy images showing expression of mCherry and GFP in ReN cells differentiated by growth factor deprivation for 3 weeks. (5C) Western blot of APP$^{SL}$ and PSEN1$^{ΔE9}$ expression in control and FAD ReN cells. (5D) Western blot of UBB$^{+1}$ expression in control and UBB$^{+1}$ ReN cells. GAPDH and tubulin were used as loading control. Scale bars: 50 μm (5B). All experiments were repeated at least twice.
Figure 5B:
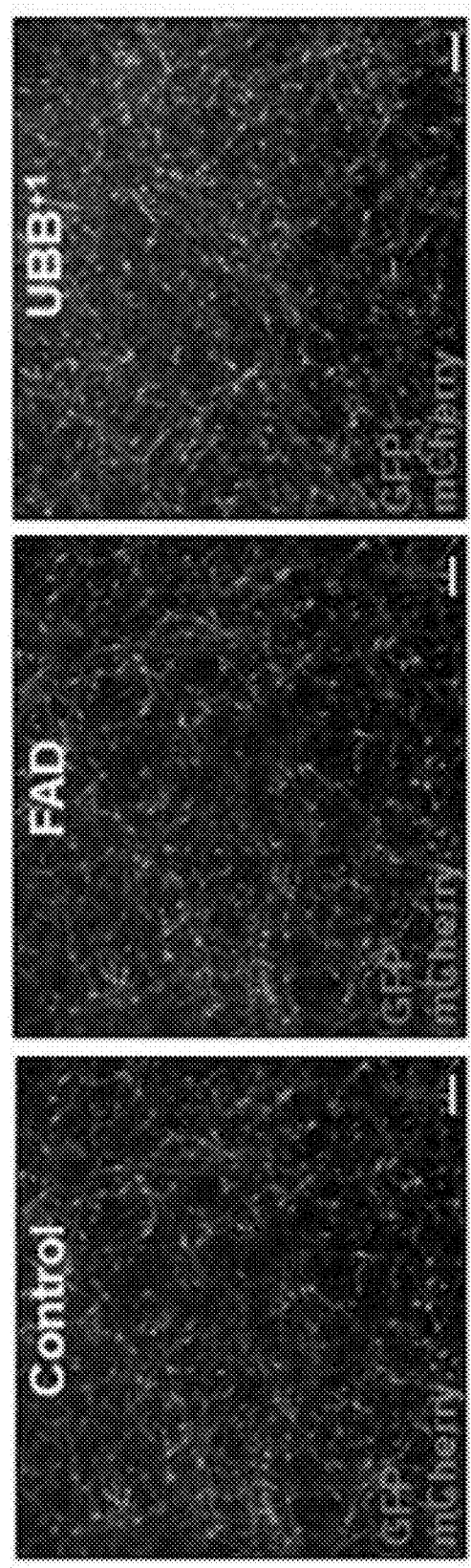
Figure 5C:
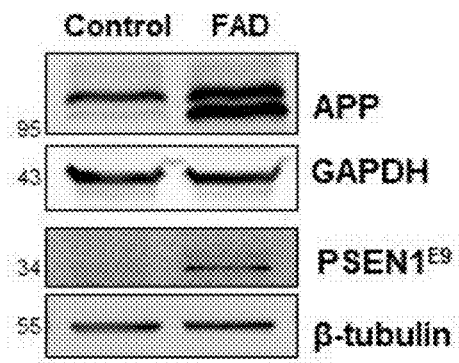
Figure 5D:
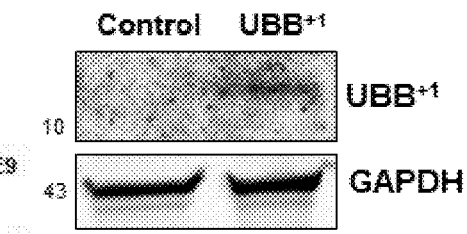
Figure 11F:
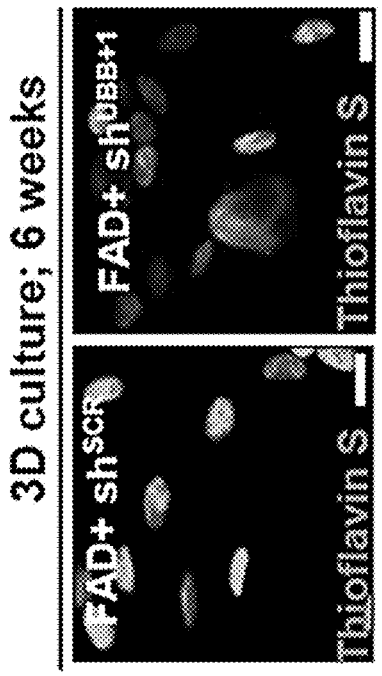
Figure 11H:
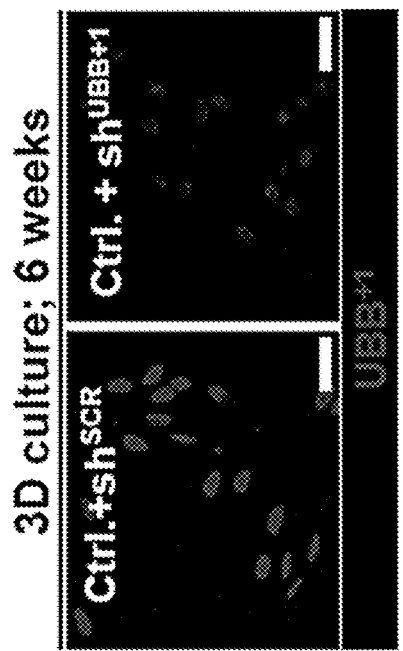
Figure 11G:
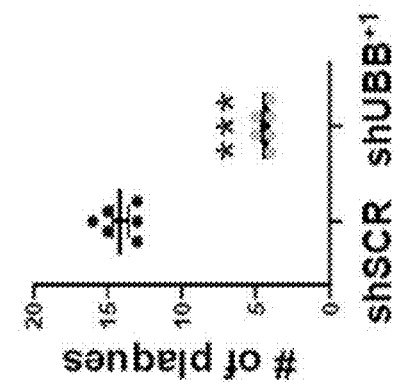
Figure 11I:
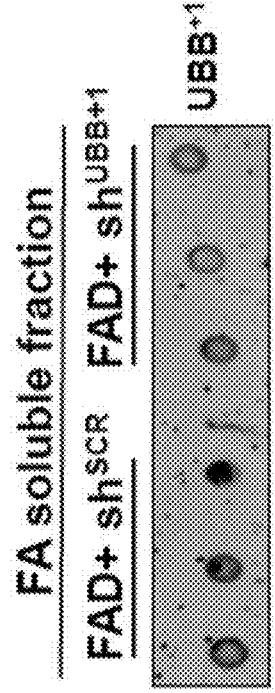
Figure 11J:
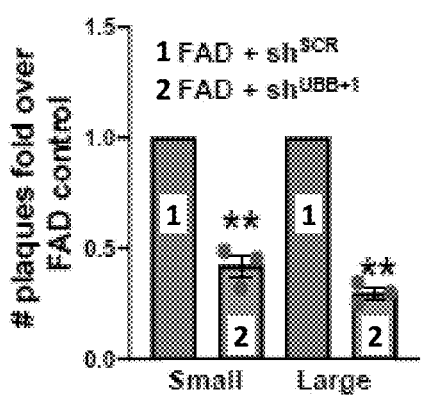
Figure 11K:
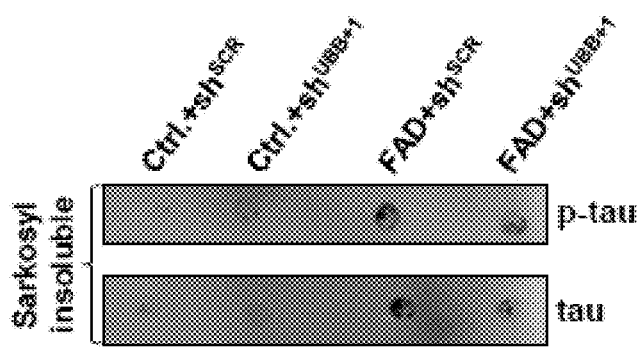

Next, neuronal progenitor cells were transduced with lentiviruses encoding shRNAs and then sorted to generate FAD/shUBB$^{+1}$ cultures (FIG. 11E). UBB$^{+1}$ levels were dramatically decreased in cultures transduced with shUBB$^{+1}$ when compared to shSCR controls (FIG. 11F). Decrease in UBB$^{+1}$ levels were observed in dot-blot analysis of FA-soluble fractions taken from six-week-old FAD+shUBB$^{+1}$ compared to FAD+shSCR (FIG. 11G). Importantly, in both three and six-week-old FAD cultures, UBB$^{+1}$ silencing lead to a significant decrease of 60-70% in Aβ plaques, with an even greater effect on the larger plaques (FIGS. 4A-4C). Immunoblotting against Aβ also verified the strong decrease in insoluble amyloid plaques (FIGS. 4D-4F). In accordance, dot-blots indicated a decrease in insoluble phosphorylated tau (FIG. 4G), while immunohistochemistry revealed a similar decrease in the number of NFTs upon silencing of UBB$^{+1}$ (FIGS. 4H-4I). These findings suggest that the pathology of FAD is dependent upon the level of UBB$^{+1}$ and that silencing UBB$^{+1}$ expression is an effective approach to hinder FAD development.

Example 2

Determining the Efficacy of a Test Substance on a Neurodegenerative Disease

The efficacy of a test substance on characteristics of a neurodegenerative disease is measured using the system.

The test substance is added to the system in different concentrations and for different durations. The culture is then examined to determine if a responsive change (such as reduction, inhibition, suppression, or prevention) has occurred in the culture in a characteristic indicative of a neurodegenerative disease.

The results enable the study of neurodegenerative diseases and the development of new therapeutic compositions.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

While the present invention has been particularly described, persons skilled in the art will appreciate that many variations and modifications can be made. Therefore, the invention is not to be construed as restricted to the particularly described embodiments, and the scope and concept of the invention will be more readily understood by reference to the claims, which follow.

What is claimed is:

1. A method for determining the efficacy of a test substance on a neurodegenerative disease, the method comprising the steps of:
    (a) contacting an in-vitro system with an effective amount of a test substance, wherein the in-vitro system comprises a three-dimensional culture comprising a cell population, and wherein at least 70% of said cell population are genetically modified neurons expressing a Ubiquitin-B+1 (UBB+1) polypeptide comprising the amino acid sequence set forth in SEQ ID NO: 1, and
    (b) determining in said in-vitro system a responsive change in at least one characteristic of a neurodegenerative disease,
    thereby determining the test substance efficacy on said neurodegenerative disease.

2. The method of claim 1, wherein said characteristic is selected from the group consisting of: axonal swelling, axonal segment breaks, amyloid Aβ plaques, a tau protein aggregation, C99 fragment accumulation, neuronal apoptosis, F-Actin bundles formation, and any combinations thereof.

3. The method of claim 1, wherein said responsive change comprises a reduction, inhibition, or suppression of said characteristic.

4. The method of claim 1, wherein said contacting is prior to cell differentiation, during cell differentiation, after cell differentiation, or any combination thereof.

5. The method of claim 1, wherein the neurodegenerative disease is Alzheimer's disease (AD), optionally wherein AD is sporadic AD.

6. The method of claim 1, wherein said genetically modified neurons comprise an exogenous polynucleotide sequence encoding the UBB+1 polypeptide.

7. The method of claim 1, wherein said three-dimensional culture further comprises an amyloid plaque, a tau protein aggregation, or both.

8. The method of claim 1, wherein said three-dimensional culture has a width of 100-300 μm.

9. The method of claim 1, wherein said three-dimensional culture has a width of 0.5-4.5 mm.

10. The method of claim 1, wherein said three-dimensional culture further comprises a scaffold, and wherein said cell population is embedded on or in said scaffold.

11. The method of claim 10, wherein said scaffold is a hydrogel.

* * * * *